(12) United States Patent
Distefano et al.

(10) Patent No.: US 10,890,018 B2
(45) Date of Patent: Jan. 12, 2021

(54) DOUBLE PULL HOOD LATCH WITH INTERLOCK DEVICE

(71) Applicant: Magna Closures Inc., Newmarket (CA)

(72) Inventors: John Distefano, Richmond Hill (CA); Csaba Szente, Newmarket (CA)

(73) Assignee: MAGNA CLOSURES INC., Ontario (CA)

( * ) Notice: Subject to any disclaimer, the term of this patent is extended or adjusted under 35 U.S.C. 154(b) by 597 days.

(21) Appl. No.: 15/658,499

(22) Filed: Jul. 25, 2017

(65) Prior Publication Data

US 2018/0030763 A1    Feb. 1, 2018

Related U.S. Application Data

(60) Provisional application No. 62/404,956, filed on Oct. 6, 2016, provisional application No. 62/366,923, filed on Jul. 26, 2016.

(51) Int. Cl.

| E05B 77/54 | (2014.01) |
|---|---|
| E05B 83/24 | (2014.01) |
| E05B 79/20 | (2014.01) |
| E05B 81/16 | (2014.01) |
| F16H 63/36 | (2006.01) |

(52) U.S. Cl.
CPC .............. *E05B 83/24* (2013.01); *E05B 77/54* (2013.01); *E05B 79/20* (2013.01); *E05B 81/16* (2013.01); *F16H 63/36* (2013.01)

(58) Field of Classification Search
CPC .......... E05B 83/24; E05B 77/54; F16H 63/40; B62D 25/12; B62D 25/105

USPC ............................................. 180/289; 701/45
See application file for complete search history.

(56) References Cited

U.S. PATENT DOCUMENTS

| 3,339,665 | A | * | 9/1967 | Johnstone | ............. | E05F 15/695 |
| | | | | | | 180/289 |
| 4,507,736 | A | * | 3/1985 | Klatt | ..................... | F16H 59/044 |
| | | | | | | 475/119 |
| 4,519,266 | A | * | 5/1985 | Reinecke | ............. | F16H 59/044 |
| | | | | | | 74/471 XY |
| 5,853,060 | A | * | 12/1998 | Chao | ...................... | E05B 83/16 |
| | | | | | | 180/69.2 |
| 6,496,106 | B1 | * | 12/2002 | Rodriguez | ............. | B62D 25/12 |
| | | | | | | 340/425.5 |
| 8,798,858 | B2 | * | 8/2014 | Zysk | ...................... | E05B 81/56 |
| | | | | | | 307/10.1 |
| 8,935,053 | B2 | * | 1/2015 | Wheeler | ................. | E05B 77/54 |
| | | | | | | 361/170 |
| 9,163,435 | B2 | * | 10/2015 | Zysk | ...................... | E05B 83/24 |

(Continued)

FOREIGN PATENT DOCUMENTS

GB         2422632 A  *  8/2006  ............. E05B 81/18

*Primary Examiner* — Ruth Ilan
(74) *Attorney, Agent, or Firm* — Dickinson Wright PLLC

(57) ABSTRACT

A hood latch system for a motor vehicle includes a vehicle hood latch assembly configured in operable communication with a gearshift member. The vehicle hood latch assembly is prevented from unintended release of a vehicle hood striker, fixed to a hood of the motor vehicle, from a ratchet of the latch assembly when the gearshift member is shifted into a non-parked mode. When the gear shift member is selectively actuated in a park mode, the vehicle hood latch assembly is actuated to release the striker from the ratchet, thereby allowing the hood to be opened.

19 Claims, 24 Drawing Sheets

(56) References Cited

U.S. PATENT DOCUMENTS

| | | | |
|---|---|---|---|
| 9,777,516 B2* | 10/2017 | Farooq | E05B 47/0001 |
| 10,060,164 B2* | 8/2018 | Rao | E05B 83/18 |
| 10,494,838 B2* | 12/2019 | Patel | E05B 81/77 |
| 2012/0175896 A1* | 7/2012 | Martinez | E05B 81/06 |
| | | | 292/199 |
| 2013/0049403 A1* | 2/2013 | Fannon | E05B 83/24 |
| | | | 296/193.11 |
| 2014/0062098 A1 | 3/2014 | Kim et al. | |
| 2016/0076279 A1* | 3/2016 | Ilea | E05B 83/24 |
| | | | 292/220 |
| 2016/0168883 A1 | 6/2016 | Konchan | |
| 2016/0362917 A1* | 12/2016 | Cumbo | E05B 83/24 |
| 2017/0167168 A1 | 6/2017 | Yu et al. | |
| 2018/0155967 A1* | 6/2018 | Peng | E05B 81/66 |
| 2018/0371807 A1* | 12/2018 | Sturm | E05B 79/20 |
| 2019/0055758 A1* | 2/2019 | Chevalier | E05B 77/36 |
| 2019/0092273 A1* | 3/2019 | Miller | F16F 9/0281 |
| 2019/0128028 A1* | 5/2019 | Herline | E05B 81/66 |
| 2019/0277068 A1* | 9/2019 | Nelsen | E05B 81/16 |
| 2020/0109580 A1* | 4/2020 | Perkins | E05B 83/24 |

\* cited by examiner

DOUBLE PULL HOOD LATCH WITH INTERLOCK DEVICE

CROSS-REFERENCE TO RELATED APPLICATIONS

This application claims the benefit of U.S. Provisional Application No. 62/404,956 filed Oct. 6, 2016 and U.S. Provisional Application No. 62/366,923 filed Jul. 26, 2016. The entire disclosure of each of the above applications is incorporated herein by reference.

FIELD OF THE DISCLOSURE

The present disclosure relates to latches for closure panels and more particularly to hood latch assemblies for motor vehicles equipped with an interlock device.

BACKGROUND OF THE DISCLOSURE

Latches for vehicle hoods and the like are typically actuated in two stages. During a first stage a first release device, such as a handle, is actuated inside the vehicle which moves the latch from a primary closed position to secondary closed position. To release the latch completely the vehicle occupant typically must exit the vehicle and actuate a second release device, such as a lever, that is under the hood. This may be inconvenient in some situations.

Double-pull release latches for vehicle hoods are also known, which allows a user to pull twice on the hood release handle positioned inside the vehicle to cause the latch to both transition from the primary closed position to the secondary closed position upon the first pull, and then to fully release the latch from the secondary closed position upon the second pull. One drawback of such a double-pull release latch for a vehicle hood is that the user may unintentionally release the hood, or have forgotten that they have released the hood, and then proceed to drive away leaving the hood in a state where it can be caught by the wind and flung upwardly.

Also known are latches having snow load levers which function only during the opening cycle ensuring full release of the latch from the primary latch and secondary latch positions to the full open position. Such snow load levers must be reset, or moved to a non-blocking position before the latch can be transitioned to the secondary or primary closed positions. One drawback of having latches with snow load levers is that upon a soft close of the hood, the force of the hood closure may not be sufficient to transition the latch to at least the secondary closed position due to the snow load lever maintaining the pawl in disengaged engagement with the ratchet.

Desired is a latch which can be unlatched in a multiple stage release actuations from inside of the vehicle only when the vehicle is in a parked state. Further, it is desired to integrate an interlock device or mechanism into the multiple stage release hood latch that is capable of preventing the latch from remaining in a released condition as a result of a soft hood close, and further reducing the risk of an unintentional multiple actuation hood release and subsequent drive away.

SUMMARY OF THE DISCLOSURE

In accordance with one aspect of the disclosure, a latch assembly for a hood release, and preferably a multiple pull latch assembly, and more preferably a double pull latch assembly, has a release lever of the latch assembly in operable communication with a gearshift member inside the vehicle to coordinate the position of the release lever in response to select actuation of the gearshift lever. The multi-pull latch assembly of the present disclosure interacts with the gearshift lever to provide an interlock mechanism configured to prevent the latch assembly from remaining in a released condition as a result of a soft hood close event as well as to prevent the risk of the vehicle driver driving away after a double pull release of the hood prior with the hood in a fully-released state.

In accordance with another aspect of the disclosure, a hood latch system for a motor vehicle is provided. The system includes a latch assembly having a release lever, a pawl assembly, and a ratchet. The release lever is pivotable from a home position to a neutral position. In the home position, the pawl assembly is maintained in locked engagement with the ratchet to maintain a striker fixed to a hood of the motor vehicle in a fully latched state in a fishmouth of the latch assembly. In the neutral position the pawl assembly is selectively movable to a release position out of locked engagement with the ratchet, whereupon the ratchet, while released from locked engagement from the pawl assembly, releases the striker from releases the striker from the fishmouth to allow the hood to be opened. Further, the system includes an interlock device configured in operable communication with the release lever. The interlock device is capable of recognizing a parked state and a non-parked state, such as neutral, reverse, and drive of the motor vehicle. The interlock device is capable of maintaining the release lever in the home position to prevent unintended release of the striker from the ratchet when the interlock device recognizes the non-parked state of the motor vehicle, and automatically moving the release lever to the neutral position when the interlock device recognizes the parked state of the motor vehicle.

In accordance with another aspect of the disclosure, the interlock device includes a gearshift member having a parked position and a plurality of non-parked positions, such as neutral, reverse, and drive for example. The gearshift member is configured to shift the motor vehicle between the parked state and the non-parked state.

In accordance with another aspect of the disclosure, the hood latch system further includes an actuation device arranged in operable communication with the gearshift member and the release lever, the actuation device causing the release lever to move in response to actuation of the gearshift member.

In accordance with another aspect of the disclosure, the hood latch system further includes a cable connecting the actuation device to the release lever.

In accordance with another aspect of the disclosure, the gearshift member is in electrical communication with the actuation device.

In accordance with another aspect of the disclosure, the release lever is configured for a double pull actuation via selective dual actuation of the gearshift member while in the parked position. Upon a first actuation of the gearshift member, while in the parked position, the pawl assembly maintains the ratchet in a partially released position to prevent complete release of the striker from the ratchet, and upon a second actuation of the gearshift member, while in the parked position, the pawl assembly releases the ratchet from the striker.

In accordance with another aspect of the disclosure, the pawl assembly includes a primary pawl configured to engage the ratchet in a primary ratchet capture position, and a secondary pawl configured to engage the ratchet in a secondary ratchet capture position. Upon the first actuation of the gearshift member, while in the parked position, the primary pawl is disengaged from the ratchet to allow the ratchet to rotate to the secondary ratchet capture position whereat the secondary pawl engages the ratchet in the secondary ratchet capture position to prevent release of the striker from the ratchet, and upon the second actuation of the gearshift member, while in the parked position, the secondary pawl releases the ratchet from the secondary capturing position to release the striker from the ratchet.

In accordance with another aspect of the disclosure, the hood latch system further includes a snow load lever moveable between an engaged position and a disengaged position. When the snow load lever is in the engaged position the snow load lever maintains the secondary pawl disengaged from the ratchet. When the release lever moves to the home position upon the interlock device recognizing the gearshift member shifting from the parked state to the non-parked state, the release lever engages the snow load lever to move the snow load lever from the engaged position to the disengaged position to allow the secondary pawl to engage the ratchet in the secondary ratchet capture position.

In accordance with another aspect of the disclosure, the gearshift member is movable along a first plane between the parked position and the plurality of non-parked positions. When the gearshift member is moveable along the first plane between the non-parked positions, the release lever remains in the home position. The gearshift member is also movable along a second plane, transverse to the first plane. When the gearshift member is in the second plane the release lever is in neutral position.

In accordance with another aspect of the disclosure, the gearshift member is configured for dual actuation along the second plane from the parked position to an actuated position and back to the parked position. During a first actuation the pawl assembly maintains the ratchet in a first release position to partially release the striker from the ratchet but prevent complete release of the striker from the ratchet. Upon a second actuation of the gearshift member from the parked position to the actuated position and back to the parked position, the pawl assembly allows the ratchet to completely release the striker from the ratchet.

In accordance with another aspect of the disclosure, a method of preventing an inadvertent unlatching of a latch assembly for a motor vehicle is provided. The method includes operably communicating a gearshift member with a release lever of the vehicle latch assembly having a pawl and a ratchet. Further yet, configuring the gearshift member to maintain the release lever in a locked, home position to maintain the pawl in locked abutment with the ratchet, such that a striker fixed to a hood of the motor vehicle is maintained in a locked position within a fishmouth of the vehicle latch assembly when the gearshift member is in a non-parked position.

In accordance with another aspect of the disclosure, the method can further include configuring the communicating between the gearshift member and the release lever to cause the release lever to move to an active position to move the pawl out of locked abutment with the ratchet upon selective actuation of the gearshift member while in a parked position.

In accordance with another aspect of the disclosure, the method can further include configuring the release lever for a double pull actuation via selective dual actuation of the gearshift member while in the parked position, such that upon a first actuation of the gearshift member, while in a parked position, the pawl maintains the ratchet in position to prevent release of the striker from the ratchet, and such that upon a second actuation of the gearshift member, while in the parked position, the pawl releases the ratchet from capturing engagement with the striker.

In accordance with another aspect of the disclosure, the method can further include configuring the gearshift member to cause the release lever to return the ratchet into a partially locked engagement with the pawl after the second actuation upon moving the gearshift member from the parked position to the non-parked position, thereby returning the striker to at least a partially captured state with the ratchet.

In accordance with another aspect of the disclosure, the method can further include configuring the gearshift member for movement along a first plane between a parked position and the non-parked positions whereupon the pawl remains in the locked, home position, and for movement along a second plane, transverse to the first plane, whereupon the pawl releases the ratchet for movement to a release position, thereby allowing the striker to be released from the fishmouth of the vehicle latch assembly.

In accordance with another aspect of the disclosure, the method can further include arranging an actuation device in operable communication with the gearshift member and the release lever and configuring the actuation device to cause the release lever to move in response to actuation of the gearshift member.

In accordance with another aspect of the disclosure, the method can further include configuring the gearshift member in electrical communication with the actuation device.

In accordance with another aspect of the disclosure, the method can further include connecting the actuation device to the release lever with a cable.

In accordance with another aspect of the disclosure, the method can further include configuring the release lever to move a snow load lever from an engaged position such that the snow load lever maintains the pawl disengaged from the ratchet, to a disengaged position such that the pawl is allowed to engage the ratchet at a partially released position to prevent complete release of the striker from the ratchet, when the release lever moves to the home position upon the gearshift member shifting from the parked position to the plurality of non-parked position.

In accordance with another aspect of the disclosure there is provided a hood latch system for a motor vehicle including a latch assembly having a release lever, a ratchet, a pawl assembly. The pawl assembly includes a primary pawl configured to engage the ratchet in a primary ratchet capture position and a secondary pawl configured to engage the ratchet in a secondary ratchet capture position. The latch assembly further includes a snow load lever moveable between an engaged position and a disengaged position such that when in the engaged position the snow load lever maintains the secondary pawl disengaged from the ratchet. The release lever is pivotable between a home position where the pawl assembly is maintained in locked engagement with the ratchet to maintain a striker fixed to a hood of the motor vehicle in a latched state in the ratchet, and a neutral position where the pawl assembly is selectively movable to the secondary ratchet capture position whereupon the ratchet, while in the secondary ratchet position, maintains the striker in a partially latched state in the ratchet. The pawl assembly further includes an interlock device configured in operable communication with the release lever. The interlock device is capable of recognizing a parked state and a non-parked state of the motor vehicle and moving the release lever to the home position upon the interlock device recognizing the motor vehicle shifting from the parked state to the non-parked state. When the release lever is moved to the home position, the release lever engages the snow load lever to move the snow load lever from the engaged position to the disengaged position to allow the secondary pawl to engage the ratchet into the secondary ratchet capture position.

BRIEF DESCRIPTION OF THE DRAWINGS

The foregoing and other aspects will now be described by way of example only with reference to the attached drawings, in which.

DETAILED DESCRIPTION OF THE DISCLOSURE

Figure 1:
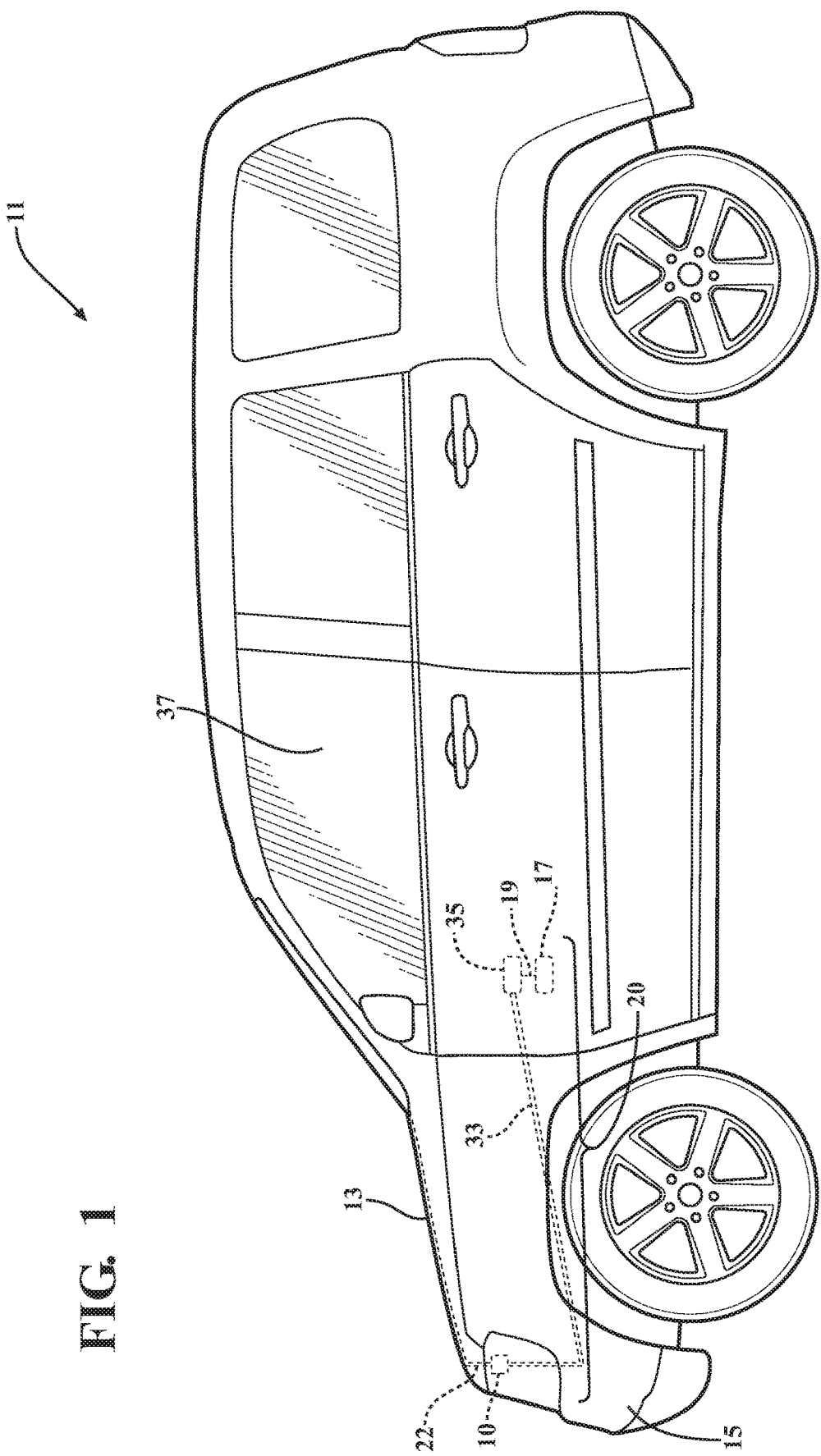
FIG. 1 is a side view of a vehicle including a double pull latch assembly in accordance with the disclosure.

Referring to FIG. 1, in accordance with an illustrative embodiment, there is shown a vehicle 11 is shown to include a body 15 to which a hood 13 is hinged for movement between open and closed positions relative to an engine compartment. A striker 22 carried by hood 13 is engageable with a latching mechanism associated with a latch assembly 10 that is mounted to vehicle body 15. A hood latch system 20 of the vehicle 11, in accordance with one aspect of the disclosure, includes the latch assembly 10; a communication link, such as cable assembly and/or electrical member 33, that operably interconnects a pivotable release lever 100 of latch assembly 10 to an actuation device 35 located within a passenger compartment 37 of vehicle 11, and a gearshift member 17. As will be detailed, actuation device 35 is directly or indirectly, mechanically and/or electrically coupled for operable communication with the gearshift member 17 of the system 20, such as a lever, depressible button, rotatable knob, or otherwise, also located within passenger compartment 37, which is operable to shift motive operation of vehicle 11 between a parked mode (P) and non-parked modes (N-R-D), shown in FIG. 2.

Figure 2:
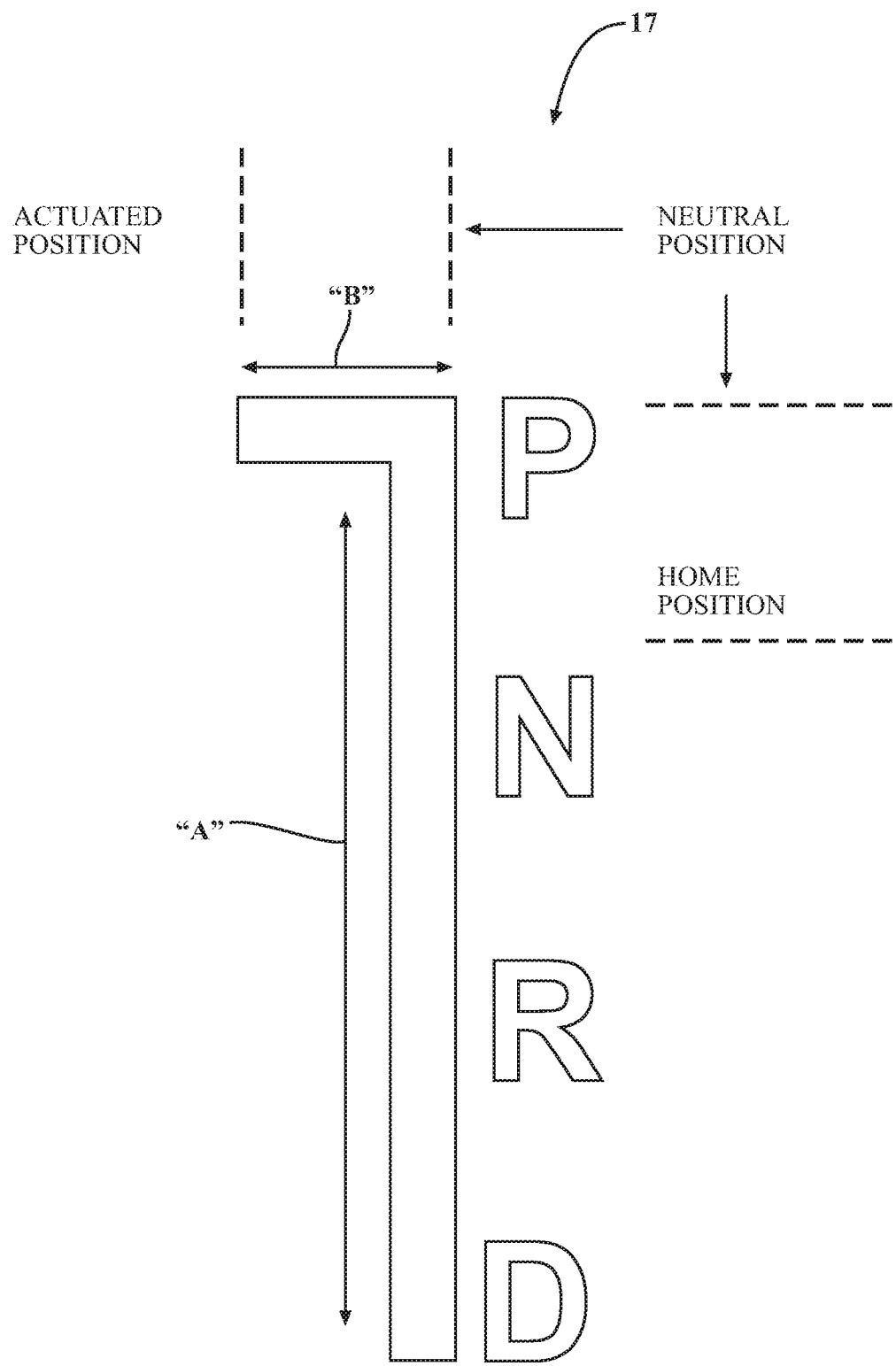
FIG. 2 is a schematic of a gearshift lever and its shift pattern and the coordinated movement of a release lever associated with a double pull latch assembly between distinct positions based on movement of the gearshift lever.

FIG. 2 illustrates various positions of the shift member 17, included a parked position and non-parked positions, and corresponding positions of the actuation device 35, also referred to as an interlock device or mechanism, that is provided in operable communication with the gearshift member 17, such as between the gearshift member 17 and the release lever 100 of latch assembly 10, by way of example and without limitation. While the embodiments herein are illustrated with reference to the actuation device 35, or interlock mechanism, being in operable communication with the gearshift member 17, for example through a mechanical or combination of mechanical/electrical communication, the interlock mechanism may be provided in operable communication with other vehicle systems and/or components, such as through an electrical (wired or wireless) communication, representative of the motive operation of the vehicle 11. For example, the actuation device 35 may be in operable communication with a vehicle door lock system via an interface with the vehicle's 11 communication network, such as a CAN bus or the like, with the unlocked state of the doors indicative that the vehicle 11 is in a parked state and/or with the locked state of the doors indicative that the vehicle 11 is in a non-parked state, for example. As another example, the actuation device 35 may be in operable communication with the vehicle control/computer system indicating the state of various vehicle operating parameters, such as throttle position, brake pedal position, key inserted, or key/on off positions, speed, engine operation, parking brake engaged, and the like. As another example, the actuation device 35 may be in operable communication with multiple vehicle systems and capable of making a determination as to the motive operation of the vehicle 11. The interlock device is thus able to recognize the parked state or the non-parked state in these and/or other manners.

As will be disclosed, the release lever 100 of latch assembly 10 is located in a "neutral" position (FIG. 6) when the gearshift member 17 is in park mode (P) and is located in a "home" position (FIGS. 4 and 5) when the gearshift member 17 is in the non-parked modes (N-R-D). Movement of the gearshift member 17, by way of example and without limitation, along a first plane (A) establishes this movement between the park and non-parked modes and respective neutral (FIG. 6) and home positions (FIGS. 4 and 5) of the release lever 100. In contrast, movement of the gearshift member 17, by way of example and without limitation, along a second plane (B), transverse to plane (A), functions, via an electrical, mechanical or electromechanical connection 19 with the actuation device 35, to move the release lever 100 via cable assembly and/or electrical member 33 from its neutral position into an "actuated" position. It is to be recognized that the aforementioned movement along planes (A) and (B), or movement along some other corresponding directions resulting in the same outcome, can be commanded via a gear shift lever, gear shift button, gear shift knob, or otherwise, depending on the particular arrangement of the gear shift member 17 and whether it is mechanically actuatable, electrically actuatable or electromechanically actuatable. Similarly, in embodiments where the interlock mechanism may be provided in operable communication with other vehicle systems and/or components (i.e. the vehicle control/computer system), the actuation device 35, may operate to move the release lever 100 via cable assembly and/or electrical member 33 (i.e. a separate electrical connection from the actuation device to the latch assembly 10, or via a preexisting communication network/bus of the vehicle 11) from its neutral position into an "actuated" position. For example, the interlock mechanism may be in operable communication with the vehicle's communication system and ECU (Engine Control Unit) and operate to move the release lever 100 when the throttle has been engaged (i.e. the gas pedal has been depressed) and the doors have been locked), or a combination of vehicle parameters, which may be considered as representative of the motive operation of the vehicle. A single or double pull actuation of the release lever 100 can be performed in conjunction with this second range of movement of the gear shift member along plane B; however, actuation of the release lever 100, and thus, unlatching of the latch assembly 10, is prevented while the gear shift member 17 is traversing along plane A in the non-parked modes (N-R-D), thereby avoiding any inadvertent, unwanted unlatching actuation of the latch assembly 10.

Figure 3:
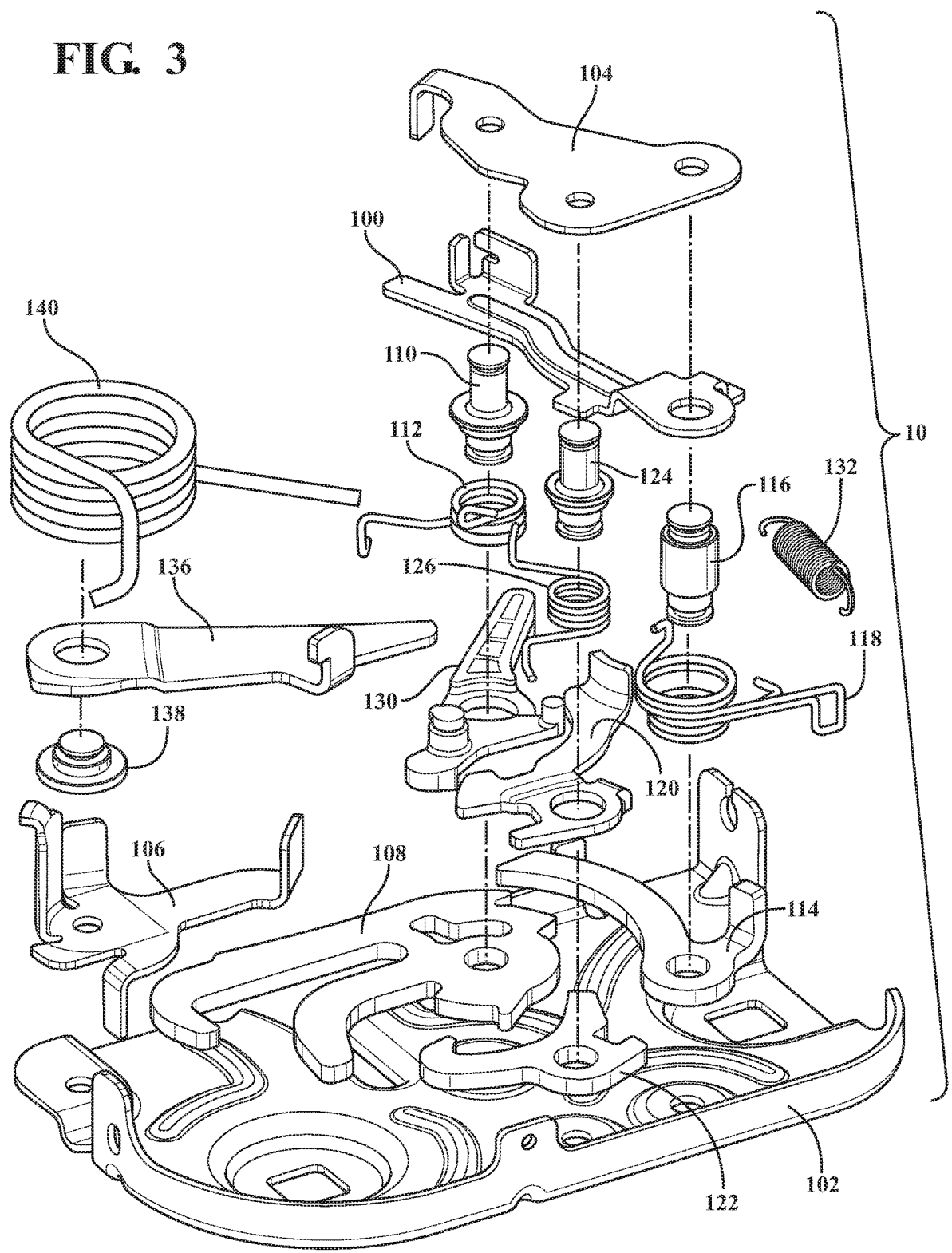
FIG. 3 is an exploded perspective view of a double pull latch assembly associated with the vehicle shown in FIG. 1 and constructed according to the present disclosure.

FIG. 3 illustrates, by way of example and without limitation, an exploded perspective of latch assembly 10 configured in accordance with one aspect of the disclosure, as a double pull, double pawl latch assembly 10, also shown in FIGS. 1, and 4-14 interacting in operable communication with the gear shift member 17 via the actuation device 35. This specific example is non-limiting since the arrangement of the interlock actuation device 35 between the release lever 100 and the gearshift member 17 (via communication member 33, e.g. cable, electrical member or similar) is applicable to virtually any hood latch release system.

Latch assembly 10 generally includes a housing 102, a cover plate 104 and a lift lever plate 106. Latch assembly 10 also includes a latching mechanism having a ratchet 108 pivotably coupled to housing 102 via a ratchet pivot, shown as a ratchet pivot rivet or pin 110, wherein the ratchet 108 is biased by a ratchet spring, shown as a torsion spring 112, by way of example and without limitation, toward a striker release position (ratchet 108 is positioned to release striker 22 in striker release position). A pawl assembly is provided and includes a primary pawl 114 is pivotably coupled to housing 102 via a primary pawl pivot, shown as a primary pawl pivot rivet or pin 116, wherein the primary pawl 114 and release lever 100 are biased by a primary pawl and release lever spring, shown as a torsion spring 118, by way of example and without limitation, with the primary pawl being biased toward a ratchet restraining position. A primary pawl extension 120 and a secondary pawl 122 are mechanically interconnected (via a lug and slot configuration) for pivotable movement on housing 102 about a secondary pivot rivet or pin 124 and are biased by a secondary pawl spring 126. A snow load lever 130 is pivotably mounted to housing 102 for pivotable movement about ratchet pivot pin 110 and is biased via a snow load spring 132. Finally, a lift lever 136 is mounted for pivotable movement about a lift lever rivet or pivot pin 138 to lift lever plate 106 and is biased via a lift lever spring 140. The function and configuration of double pull, double pawl latch assembly 10 is intended to provide a preferred construction of a hood latch applicable to be operably interconnected to the gearshift member 17 (directly via a cable or electrical member or indirectly via another cable or electrical member, and can be further operably connected to a release member, such as release handle) to provide an interlock arrangement preventing inadvertent, unintentional unlatching of the latch assembly 10 and providing an optimized performance in comparison to conventional systems. While the pawl assembly described hereinabove was made with reference to a double pawl arrangement having a primary pawl and a secondary pawl, the pawl assembly may also be provided with a single pawl, or other arrangement which provides for a locking/unlocking of the ratchet 108 at desired position(s) to control the release and/or capture of the striker 22.

Figure 4:
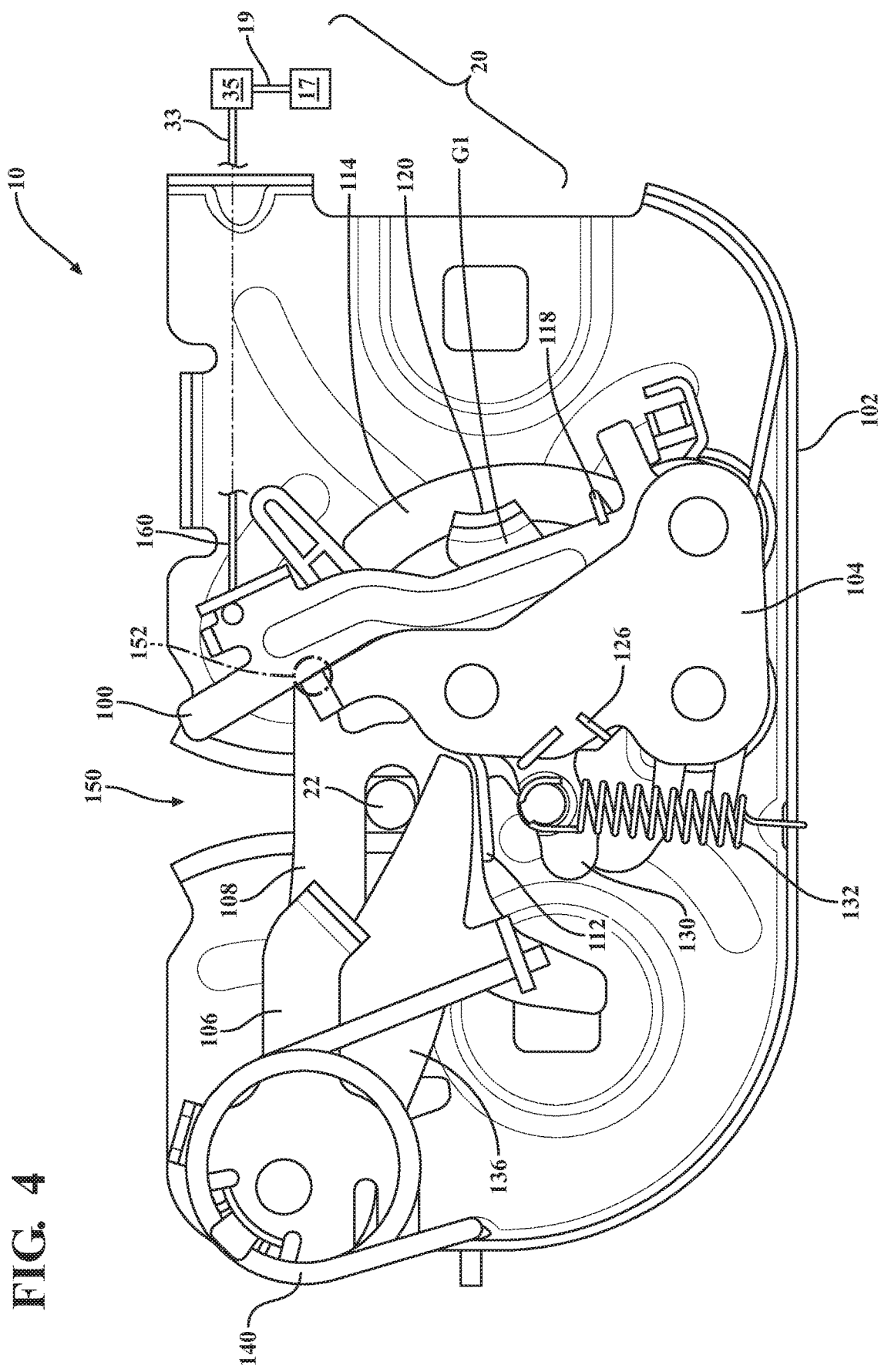
FIG. 4 is a plan view of the latch assembly of FIG. 3 in a primary latched mode with the release lever shown in a "home" position.
Figure 5:
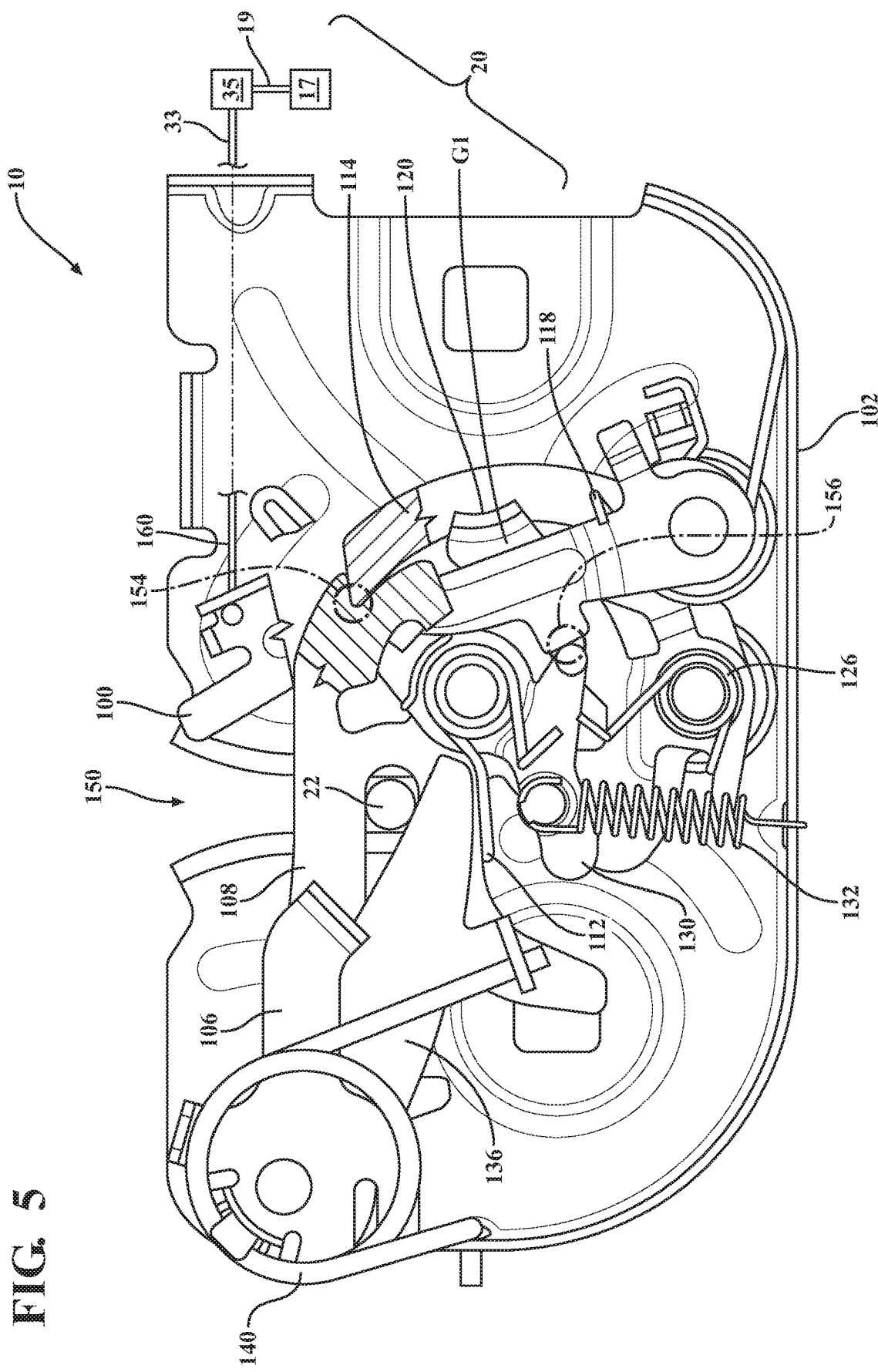
FIG. 5 is a view similar to FIG. 4, but showing portions removed for additional clarity.

FIGS. 4 and 5 illustrate latch 10 with striker 22 retained in a fishmouth 150 of housing 102 with ratchet 108 held in its primary striker capture position by primary pawl 114. Circle 152 of FIG. 4 illustrates engagement of release lever 100 with a stop on cover plate 104 when release lever 100 is located in its home position, corresponding to the gearshift member 17 being in the non-parked modes (N-R-D). When the release lever 100 is located in the home position, circle 154 of FIG. 5 shows engagement of primary pawl 114 with a primary latch notch on ratchet 108 while circle 156 illustrates release lever 100 engaging snow load lever 130. This relationship results in snow load lever 130 being positioned and maintained in a disengaged position via release lever 100 and creates a gap G1 between it and primary pawl extension 120. FIGS. 4 and 5 are reflective of the positioning of the latch components and particularly release lever 100 when vehicle 11 is in motive operation, illustratively when gearshift member 17 is shifted out of park P into one of the non-parked states N, R, D. While the gearshift member 17 is in this position, the release lever 100, and thus the latch assembly 10, are prevented from being actuated to a striker release state, since the primary pawl 114 and secondary pawl 122 cannot be moved out of their ratchet restraining position due to the double pull actuation of the release lever 100 only being able to be to performed in conjunction with the second range of movement of the gear shift member along plane B, and not while the gear shift member 17 is traversing along plane A in the non-parked modes (N-R-D), thereby preventing unintentional unlatching of the latch assembly 10.

Figure 6:
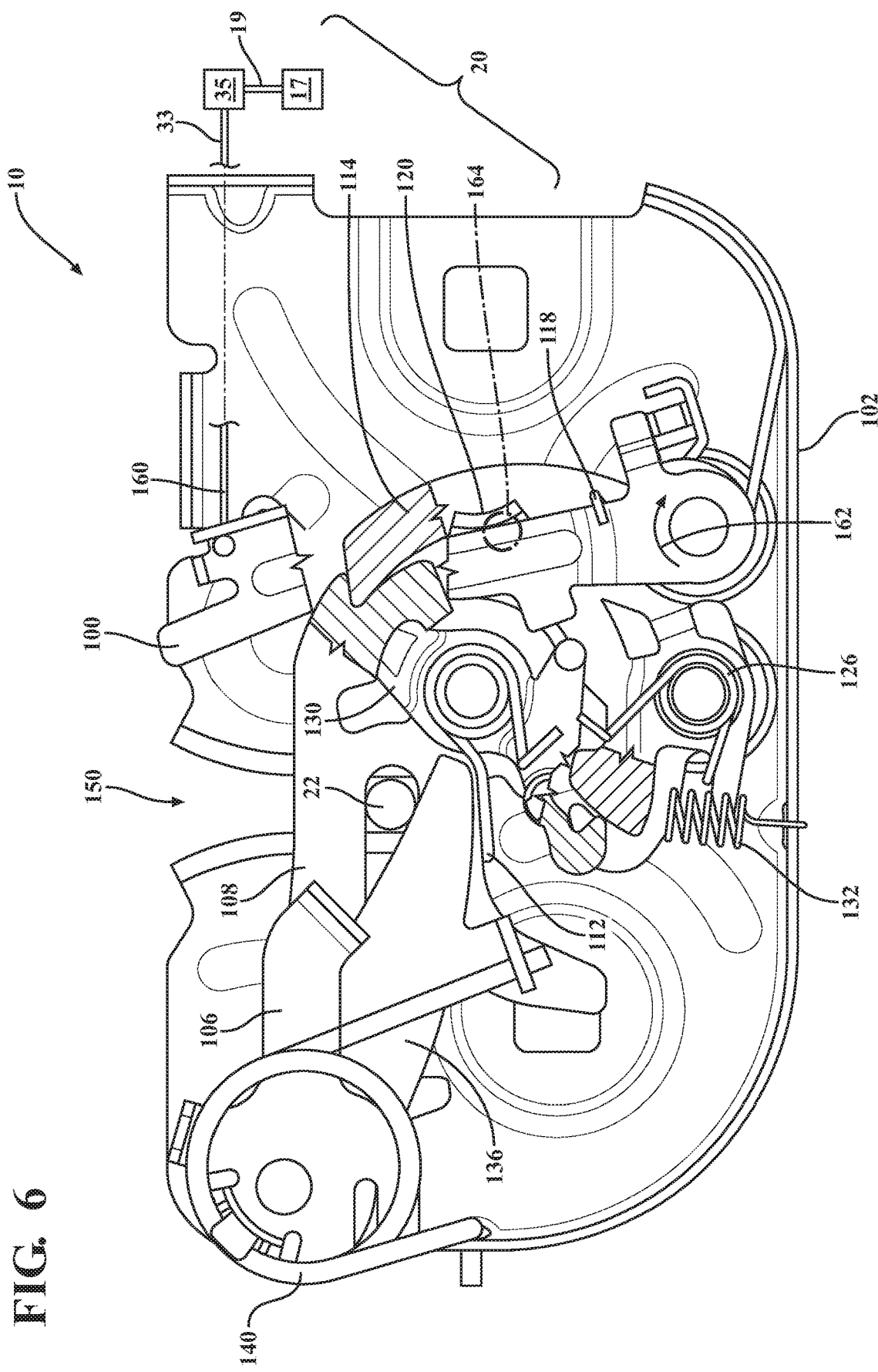
FIG. 6 is a plan view of the latch assembly of FIG. 3 in the primary latched mode with the release lever shown in a "neutral" position.

FIG. 6 illustrates the components of latch assembly 10 when the gearshift member 17 is returned to its parked state P such that release lever 100 is moved, for example automatically moved, into its neutral position, by cable 160 acting on the release lever 100 to maintain the release lever 100. Cable 160, by way of example and without limitation, is connected to release lever 100, with cable 160 being operably coupled for selective movement (directly or indirectly) with the gearshift member 17, such as via cable and/or electrical member 33 and actuation device 35. It is to be recognized that cable 160 could be replaced with an electrical member for electrical actuation of the latch assembly 10, if provided as an electrically actuatable latch (having an electric motor (not shown) local or proximate to the latch assembly 10 for example), as will be readily appreciated by one possessing ordinary skill in the art upon viewing the disclosure herein. Release lever 100 can be selectively and intentionally rotated while the gearshift member 17 is in the parked state P for reasons explained herein above, as indicated by arrow 162, by cable 160 which results in the contact between release lever 100 and primary pawl extension 120 (circle 164) and also causes snow load lever 130 to rotate and ride along a profile formed on primary pawl extensions 120.

Figure 7:
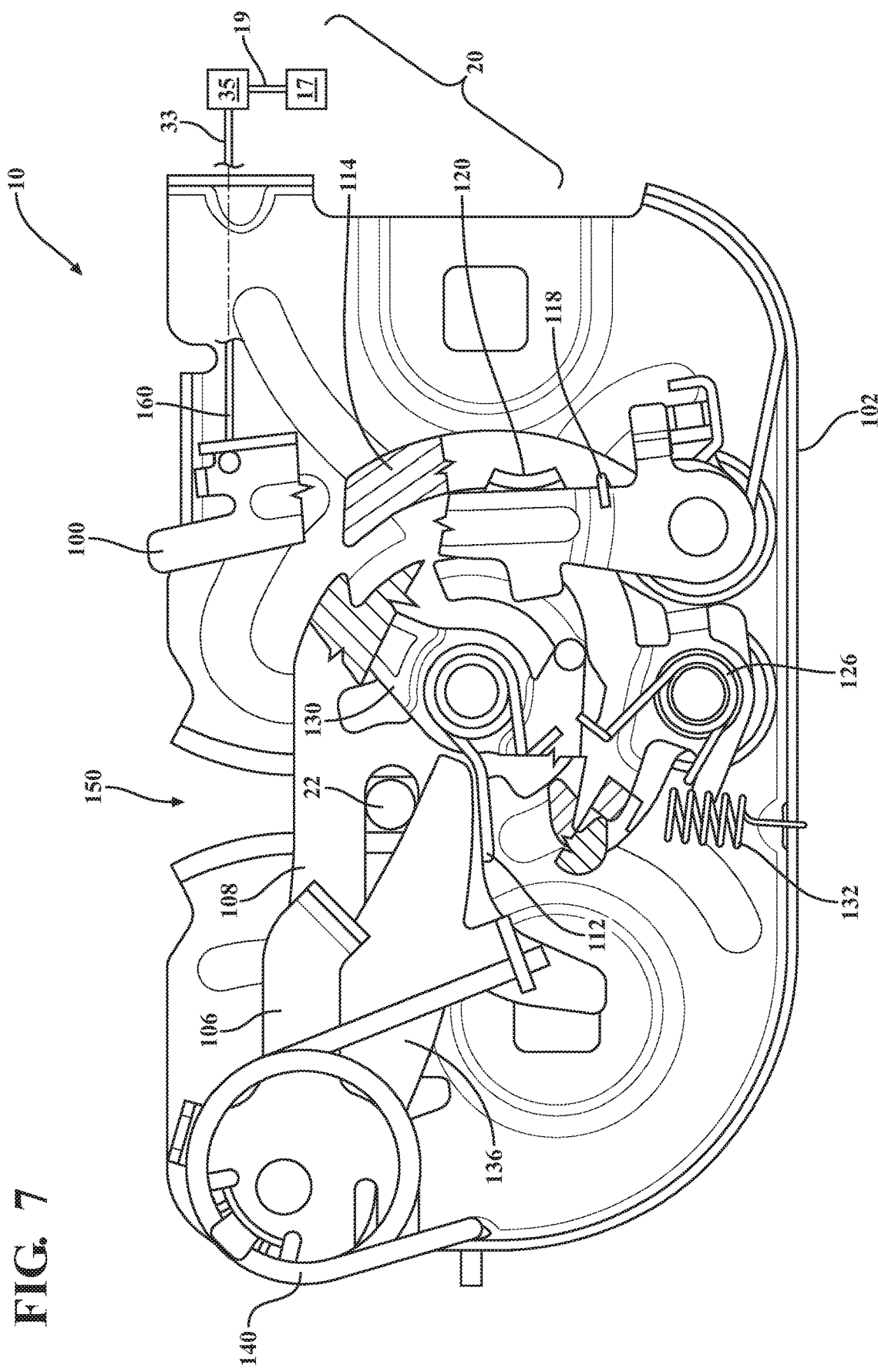
FIG. 7 is a plan view of the latch assembly of FIG. 3 with components moved following a first pull operation of a release device (mechanically coupled to the gearshift lever) with the release lever moved to an "actuated" position.
Figure 8:
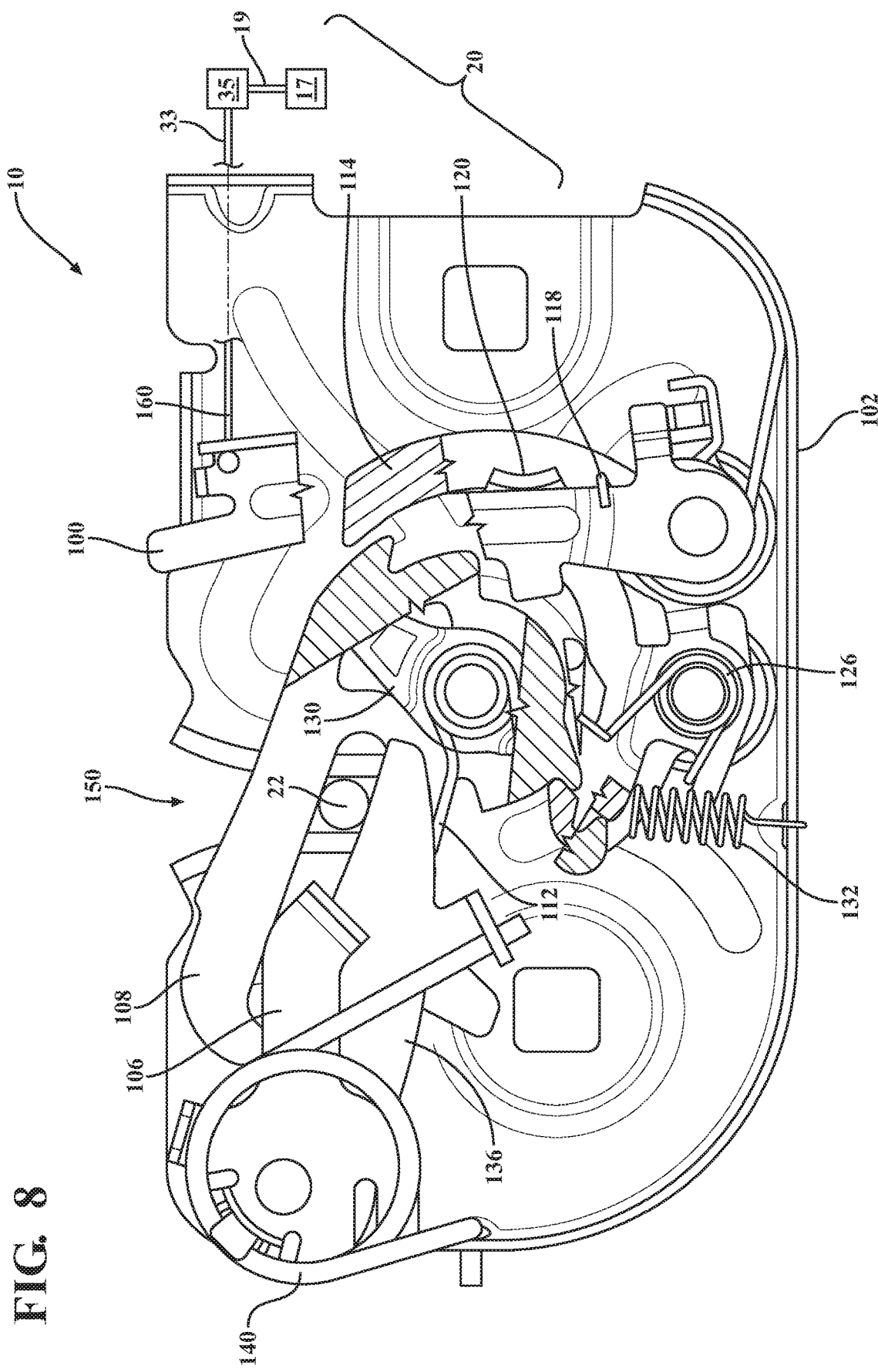
FIG. 8 is similar to FIG. 7 with a ratchet moved to an intermediate position awaiting return of the release lever to its neutral position.
Figure 9:
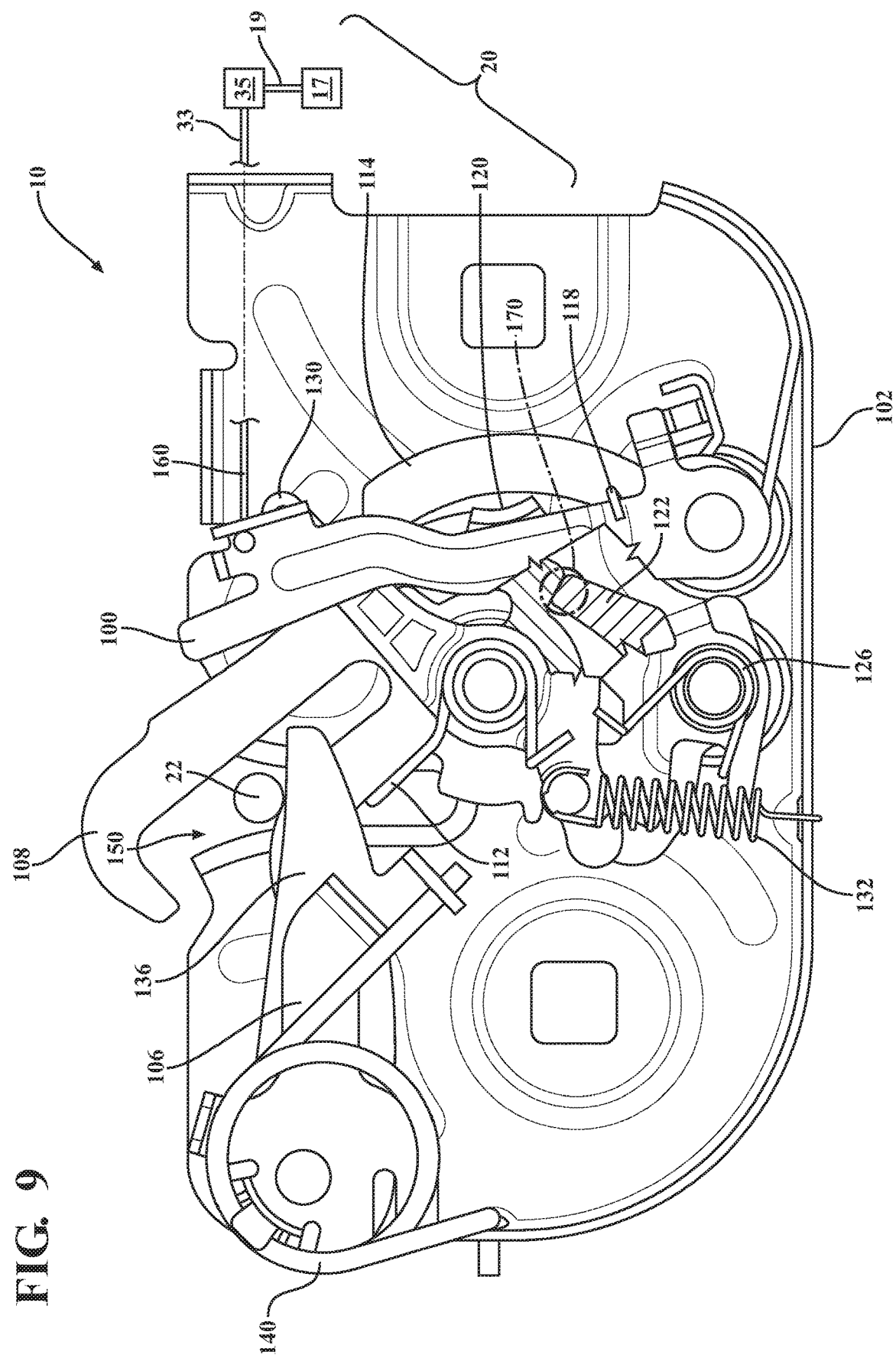
FIG. 9 is a plan view of the latch assembly of FIG. 3 upon release of the first pull such that the release lever is returned to its "neutral" position with the latch in a secondary latched mode.

FIGS. 7 and 8 illustrate selective, desired actuation of the latch assembly 10 in response to transverse movement of the gearshift member 17 along plane "B" to define a "first pull", by way of example and without limitation, on release lever 100. Both drawings illustrate release lever 100 in the actuated position due to the first pull prior to release for subsequent return of the release lever 100 to the neutral position. During a "first pull", the rotation of the release lever 100 acts upon the primary pawl 114 to rotate the primary pawl 114 out of engagement with a primary latch notch on ratchet 108. Illustratively, upstanding lugs 111,113 provided on the primary pawl 114 and the release lever 100 respectively, contact (circle 165) to urge the rotation of the primary paw 144 as imparted by the rotation of the release lever 100 acting through the upstanding lugs 111,113. With the primary pawl 114 disengaged from the primary latch notch on ratchet 108, the ratchet 108 may rotate out of its primary ratchet restraining position. Upon release lever 100 being released to return the release lever 100 to the neutral position, the ratchet 108 may continue to rotate until the secondary pawl 122 engages an extension on the ratchet defining an intermediate ratchet hold position 144. Upon the release lever 100 return, the secondary pawl 122 disengages the ratchet 108 allowing the lift lever 136 to forcibly raise striker 22 a certain distance (e.g. 22 mm) from its primary striker capture position and which is counterbalanced by the weight of the hood 13 and spring 140. In this condition, ratchet 108 is held in its secondary striker capture position (i.e. secondary catch position) (FIG. 9). As illustrated, primary pawl extension 120 and/or secondary pawl 122 held in contact with the ratchet 108 profile (see circle 174) provides a hard stop (as visualized in circle 170) for ratchet 108 and holds it in the secondary catch position, as would be the case if an upward force is applied to the hood 13, for example due to a wind force tending to lift the hood 13 if the vehicle 11 is in motion, or is a user is attempting to move the hood 13 to its fully open position. This hard stop prevents the hood 13 from opening without any further action.

Figure 10:
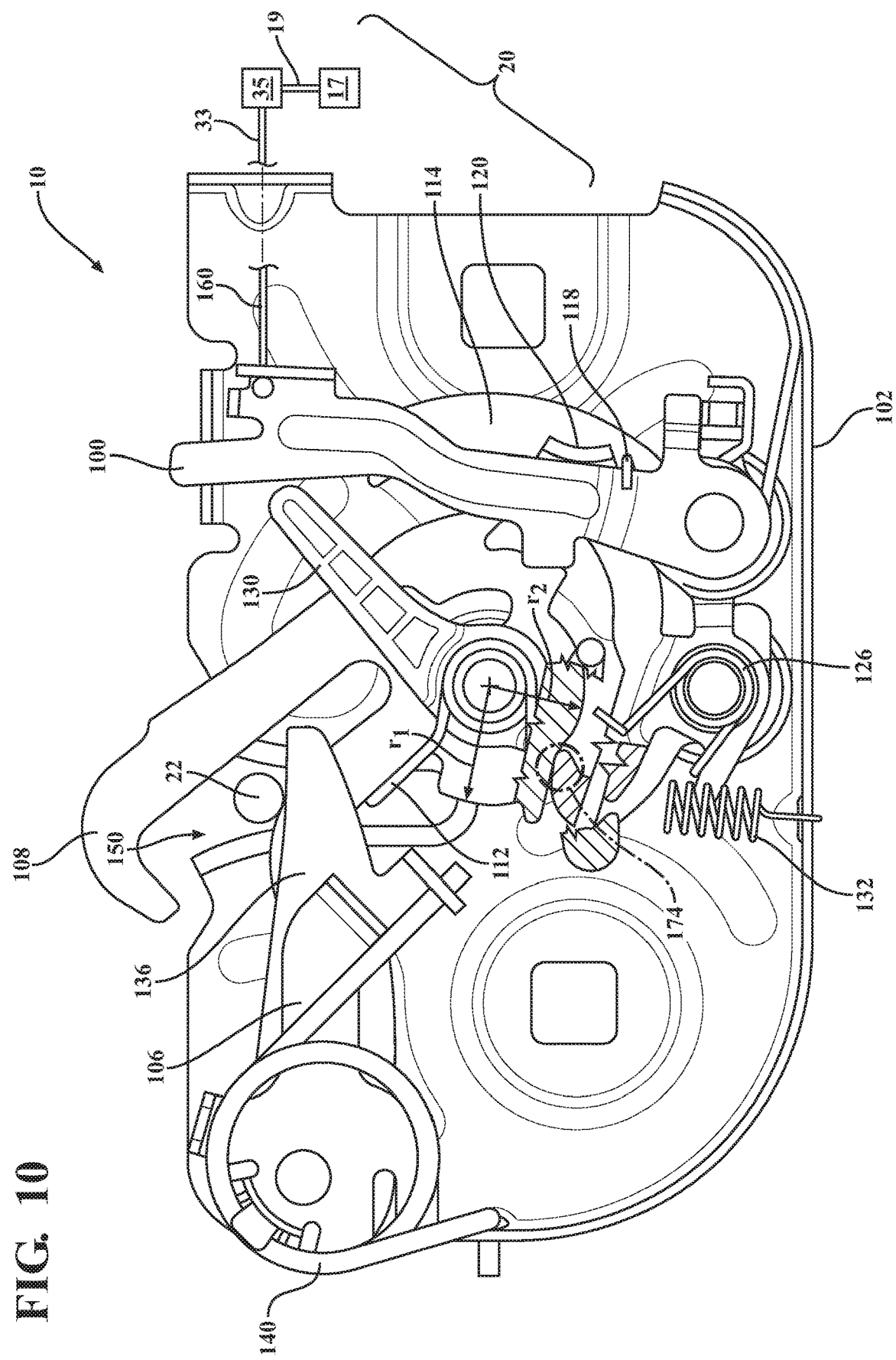
FIG. 10 is a plan view of the latch assembly of FIG. 3 with the components moved following a second pull operation on the release device.
Figure 11:
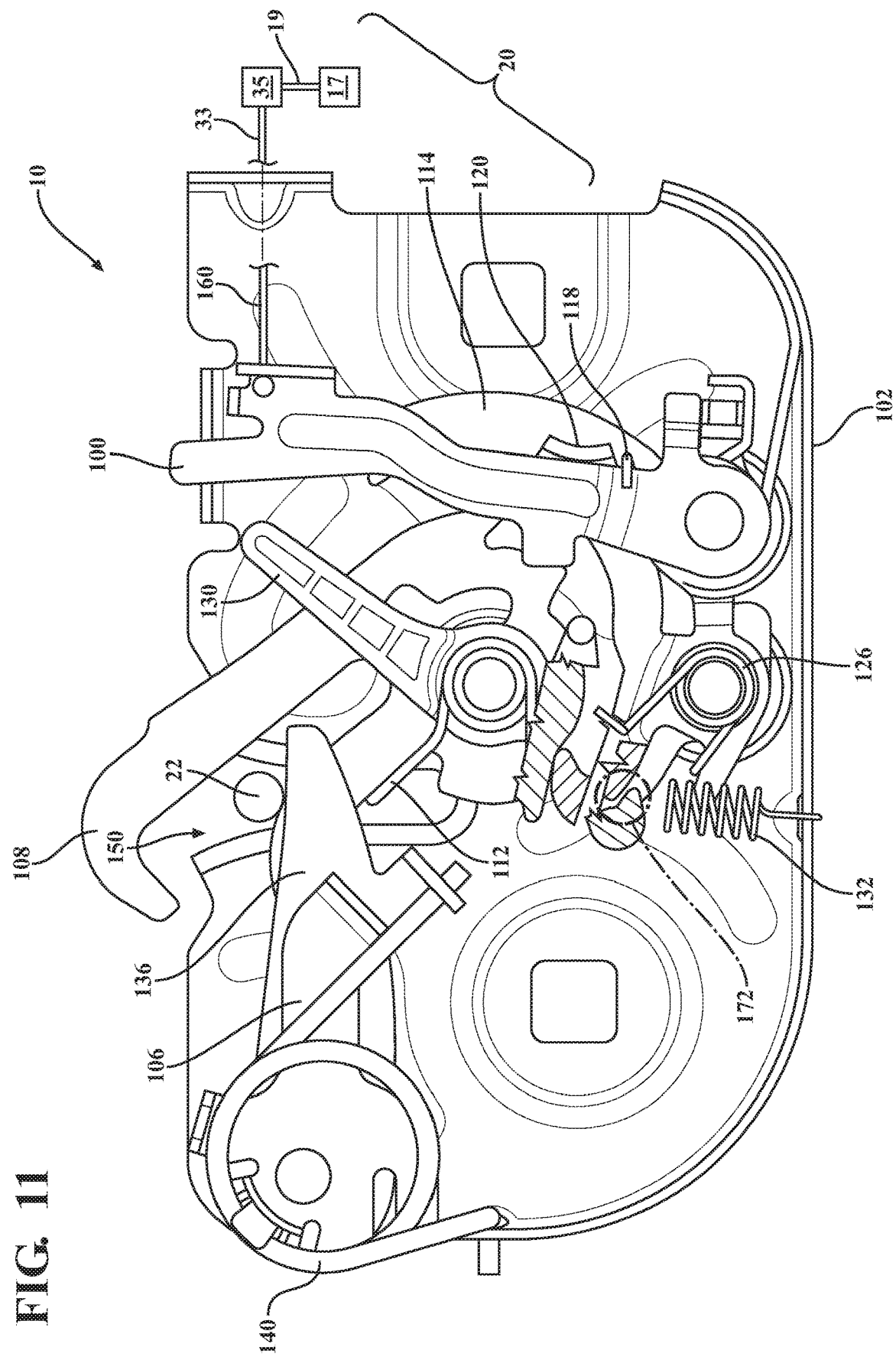
FIG. 11 is similar to FIG. 10.
Figure 12:
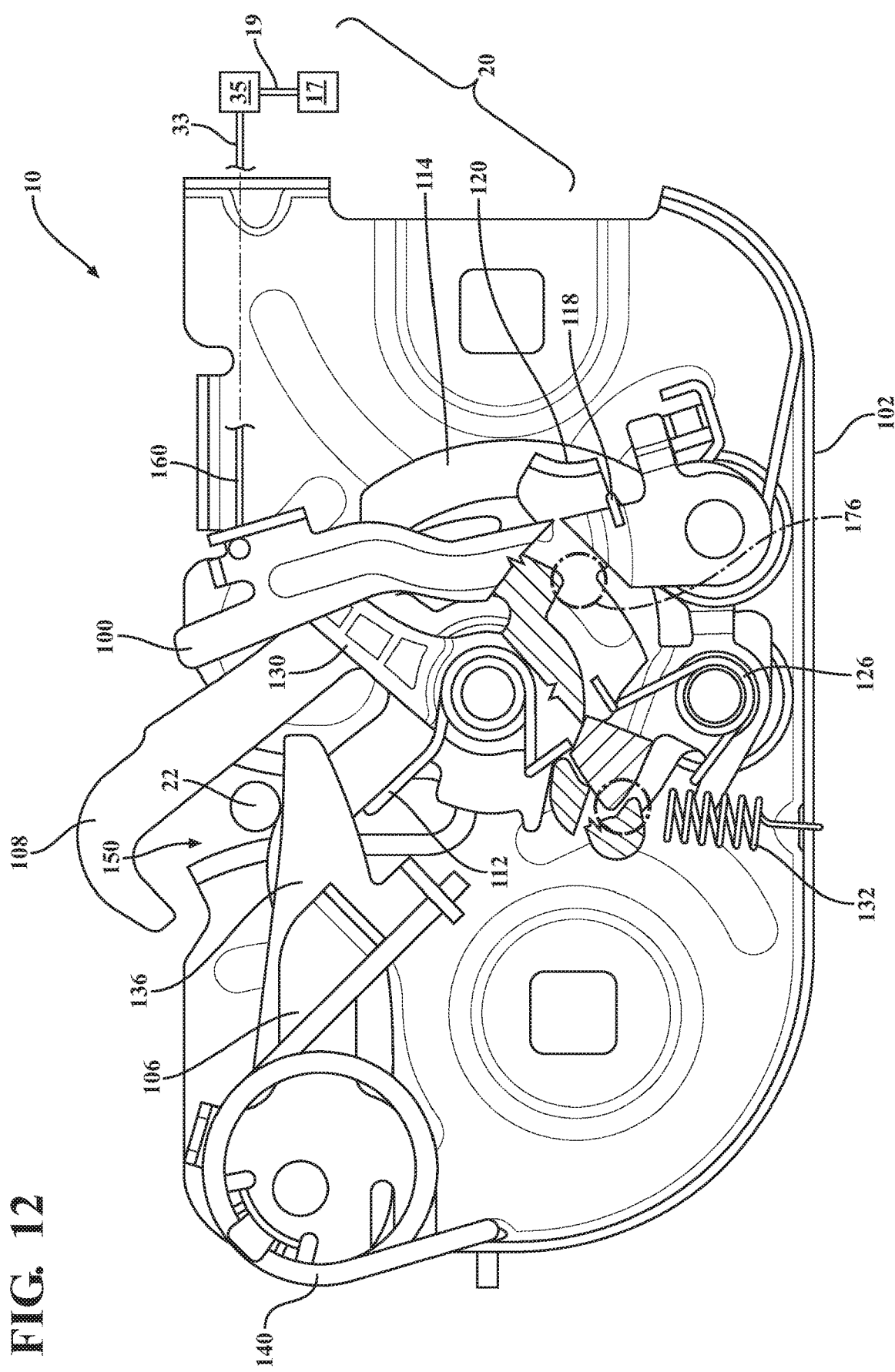
FIG. 12 is a plan view of the latch assembly in an opened mode following release of the release device following the second pull to allow opening of the hood.
Figure 13:
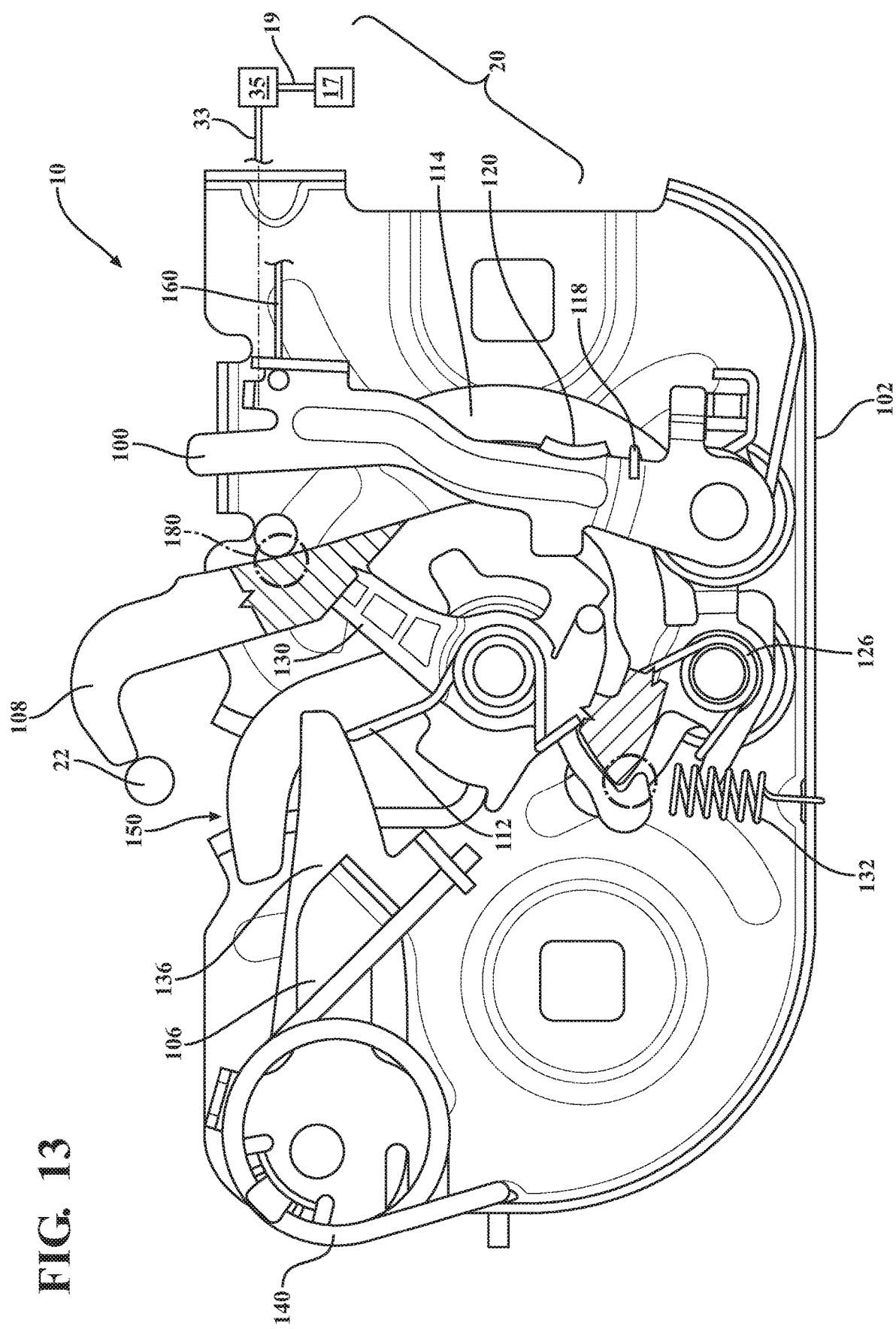
FIGS. 13 and 14 show a resetting of the latch upon movement of the ratchet to its fully open position.
Figure 14:
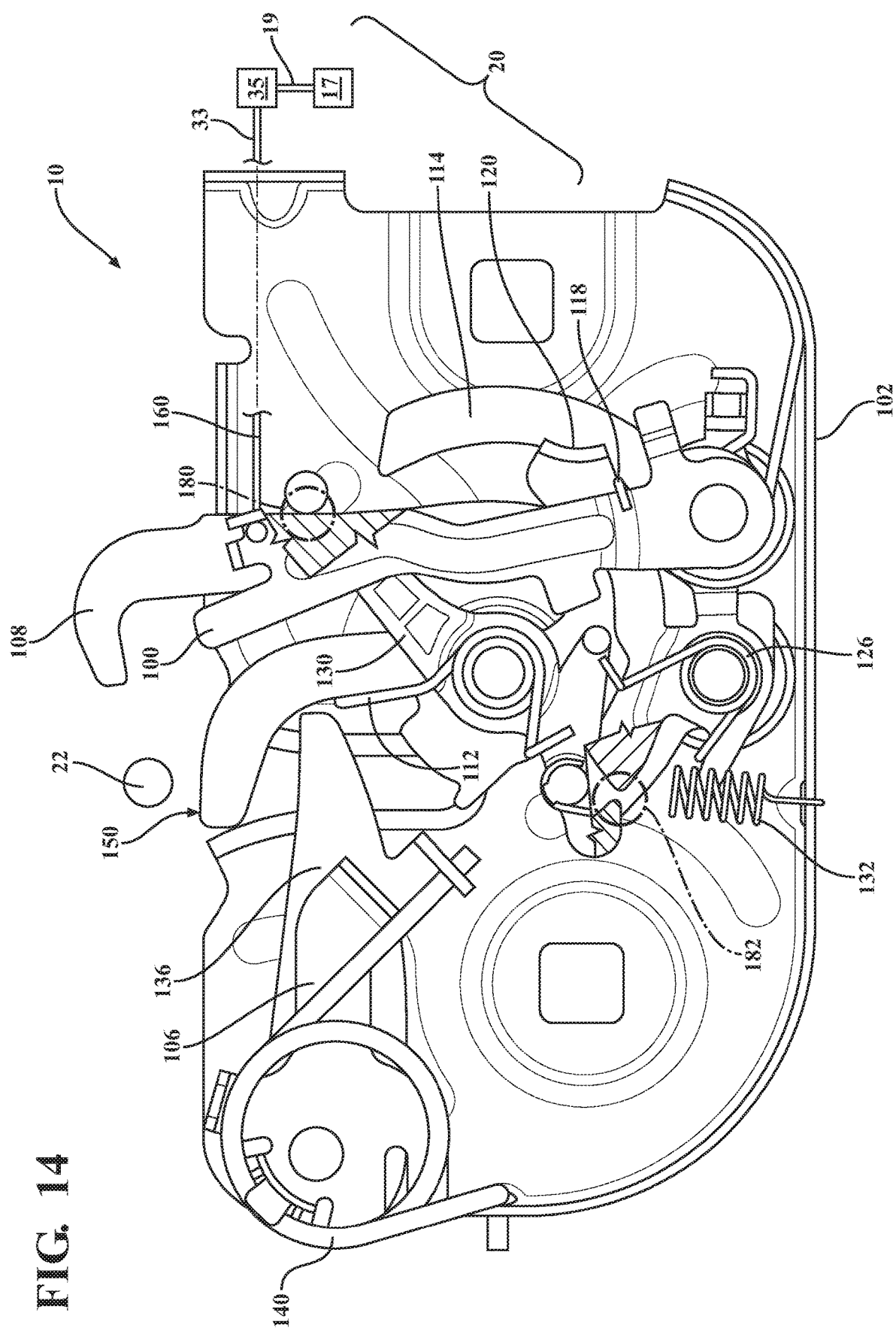

FIGS. 10-12 illustrate the "second pull" associated with the selective actuating second movement of the gearshift member 17 along the "B" plane so as to again move the release lever 100 from its neutral position to its actuated position. In accordance with the illustrated embodiment, the resulting travel of the release lever 100 during the second pull is greater due to a smaller radius 21 relative to r1 on the ratchet profile, by way of example and without limitation. Circle 174 of FIG. 10 shows secondary pawl 122 and consequently release lever 100 rotated to a position of engagement with the profile on ratchet 108. As a result of snow load lever 130 engagement, the secondary pawl 122 is as shown in circle 176 of FIG. 12. The ratchet 108 is no longer blocked from movement and therefor the hood 13 can be intentionally moved to opened position. Circle 172 of FIG. 11 shows snow load lever 130 engaging primary pawl extension 120 to maintain the secondary pawl 122 in a ratchet non-restraining position (or non-blocking position). When the hood 13 is physically moved (with ratchet 108 in its striker release position) to its fully open position, snow load lever 130 is contacted by ratchet 108, as shown by circle 180 in FIG. 13, and is reset to its disengaged position allowing the primary pawl extension 120 and secondary pawl 122 to block the ratchet 108. Circle 180 in FIG. 14 illustrates ratchet 108 contacting snow load lever 130 while circle 182 illustrates snow load lever 130 disengaged from primary pawl extension 120. This action resets the latch 10, providing for the secondary catch position, in anticipation of subsequent closure of the hood 13. Alternatively, but not mutually exclusive, the latch 10 can be reset once the gearshift member 17 is again moved out of the parked P condition, as shown in FIG. 5 via release lever 100 contacting snow load lever 130. As a result of the transition of gearshift member 17 from the parked state P into one of the non-parked states N, R, D, the snow load lever 130 is disengaged from ratchet 108 to allow the striker 22 to return to the secondary catch position with the ratchet 108. This ensures that should a user intentionally, or unintentionally, cause the transverse movement of the gearshift member 17 along plane "B" to define a "first pull", and subsequently a "second pull" by way of example and without limitation, on release lever 100, yet does not exit the vehicle and return the hood 13 to a fully closed state (i.e. closing the hood to cause the ratchet 108' to move the snow load lever 130' into its disengaged position to allow the ratchet 108' to rotate to a primary or secondary striker capture positions), moving the gearshift member 17 out of the parked P condition causes the latch to reset, providing a secondary catch position (i.e. the ratchet 108' will be held in the secondary catch position). This occurs when the release lever 100 returns to the home position when the gearshift member 17 is moved out of the parked P condition and acts on the snow load lever 130 (seen at circle 156 of FIG. 5) to move the snow load lever into its disengaged position.

Accordingly, in view of the above disclosure and as shown in the several figures, actuation of the latch assembly 10 can be performed in response to selective (intentional) actuation of the gearshift member 17 while the gearshift member 17 remains in a park (P) position. As shown, the actuation of the gearshift member 17 involves moving the gearshift member 17 along plane "B" while in the park position (P); however, it is to be recognized that movement of the gearshift member 17 could be other than illustrated, as will be understood by one possessing ordinary skill in the art. For example, if the gearshift member 17 is electrically activated, the movement of the gearshift member 17 could include selective actuation of the actuation device 35, which can be provided as any suitable electromechanical linear actuator or the like, such as a solenoid, or an electromechanical switch or sensor, by way of example and without limitation, and concurrent actuation of the latch assembly 10 via pushing or depressing the gearshift member 17, such as a gearshift button, by way of example and without limitation, with software executed by an onboard vehicle computer system processing the activation of the gearshift member 17 for example. Accordingly, one skilled in the art will recognize that, depending on the type of gearshift member provided, whether mechanical, such as a translatable lever, electrical or electromechanical, different actuation mechanisms can be employed to operably couple the gearshift member 17 to the actuation device 35 and/or to the release lever 100 to selectively actuate (pivot) release lever 100 for intended actuation of the latch assembly 10.

Figure 15:
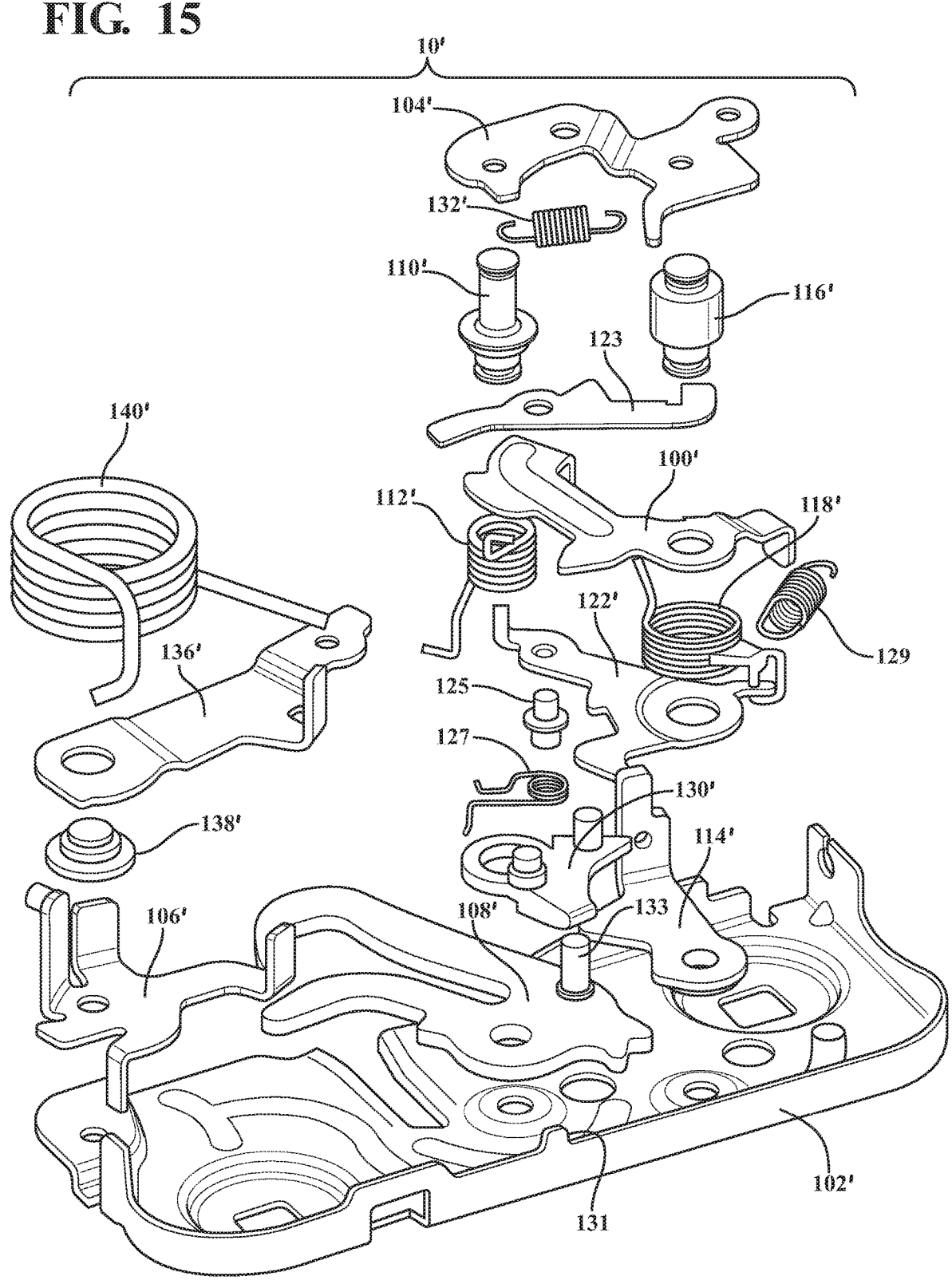
FIG. 15 is an exploded perspective view of a double pull latch assembly associated with the vehicle shown in FIG. 1 and constructed according another aspect of the present disclosure.

FIG. 15 illustrates an exploded perspective of latch assembly 10' configured as a double pull, double pawl latch assembly (a three position latch for example) in accordance with another aspect of the disclosure, wherein the same reference numerals as used above, offset by a prime symbol ('), are used to identify like features. A vehicle hood latch system 20', comprising the latch assembly 10', a shift member 17, a communication link 33 and actuation device 35 (interlock arrangement), as discussed above, is only exemplary and is non-limiting since the interlock arrangement between a release lever 100' of the latch assembly 10' and the gearshift member 17, such as discussed above (via cable and/or electrical member or similar) is applicable to virtually any hood latch release system, whether single pull, double pull, or otherwise.

Latch assembly 10' generally includes a housing 102', a cover plate 104' and a lift lever plate 106'. Latch assembly 10' also includes a latching mechanism having a ratchet 108' pivotably coupled to housing 102' via a ratchet pivot, shown as a ratchet pivot pin 110', wherein the ratchet 108' is biased by a ratchet spring, shown as a torsion spring 112', by way of example and without limitation, toward a striker release position (ratchet 108' is positioned to release striker 22 in striker release position). A primary pawl 114', secondary pawl 122' and release lever 100' are pivotably coupled to housing 102' via a common pivot member, shown as a pawl pivot pin 116', wherein primary pawl 114' and secondary pawl 122' are biased by a common pawl spring, shown as a torsion spring 118', by way of example and without limitation, toward a ratchet restraining/locking position. A position lever 123 is arranged for pivotable movement on secondary pawl 122' about pivot pin 125 and is biased by a position lever spring 127. A snow load lever 130' is pivotably mounted to housing 102' and is biased via a snow load spring 132'. Finally, a lift lever 136' is mounted via a pivot 138' to lift lever plate 106' and is biased via a lift lever spring 140'. As with the previously described latch assembly 10, the function and configuration of double pull, double pawl latch assembly 10' is intended to provide a preferred construction of a vehicle hood latch assembly 10' applicable to be interconnected to the gearshift member 17 (directly via a cable and/or electrical member or indirectly via a secondary cable and/or electrical member, and can be further operably connected to a release member, such as separate latch assembly release handle) to provide an interlock arrangement, preventing unintentional unlatching of the latch assembly 10' and providing an optimized performance in comparison to conventional systems.

Figure 16:
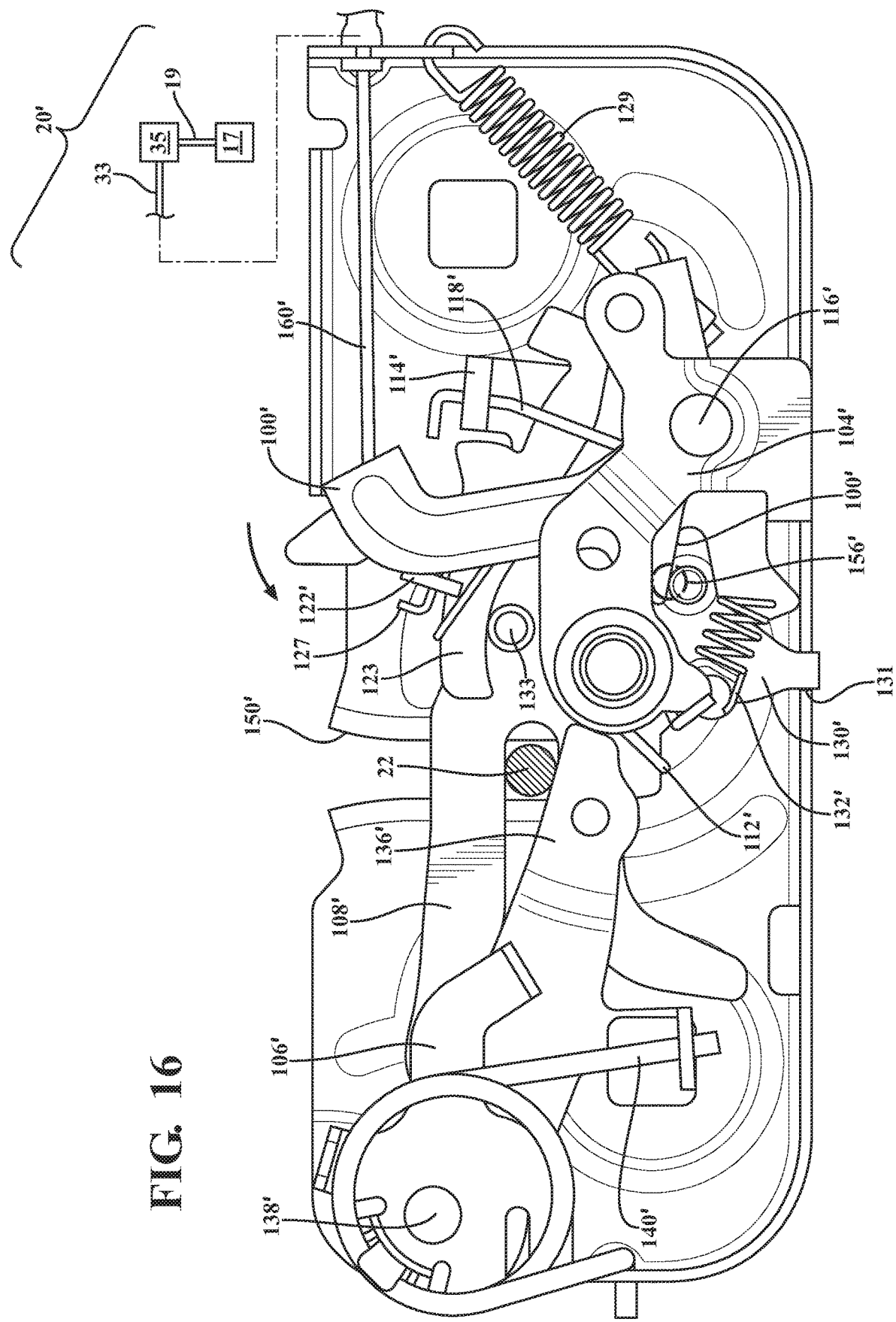
FIG. 16 is a plan view of the latch assembly of FIG. 15 in a primary latched mode with the release lever shown in a "home" position.
Figure 17:
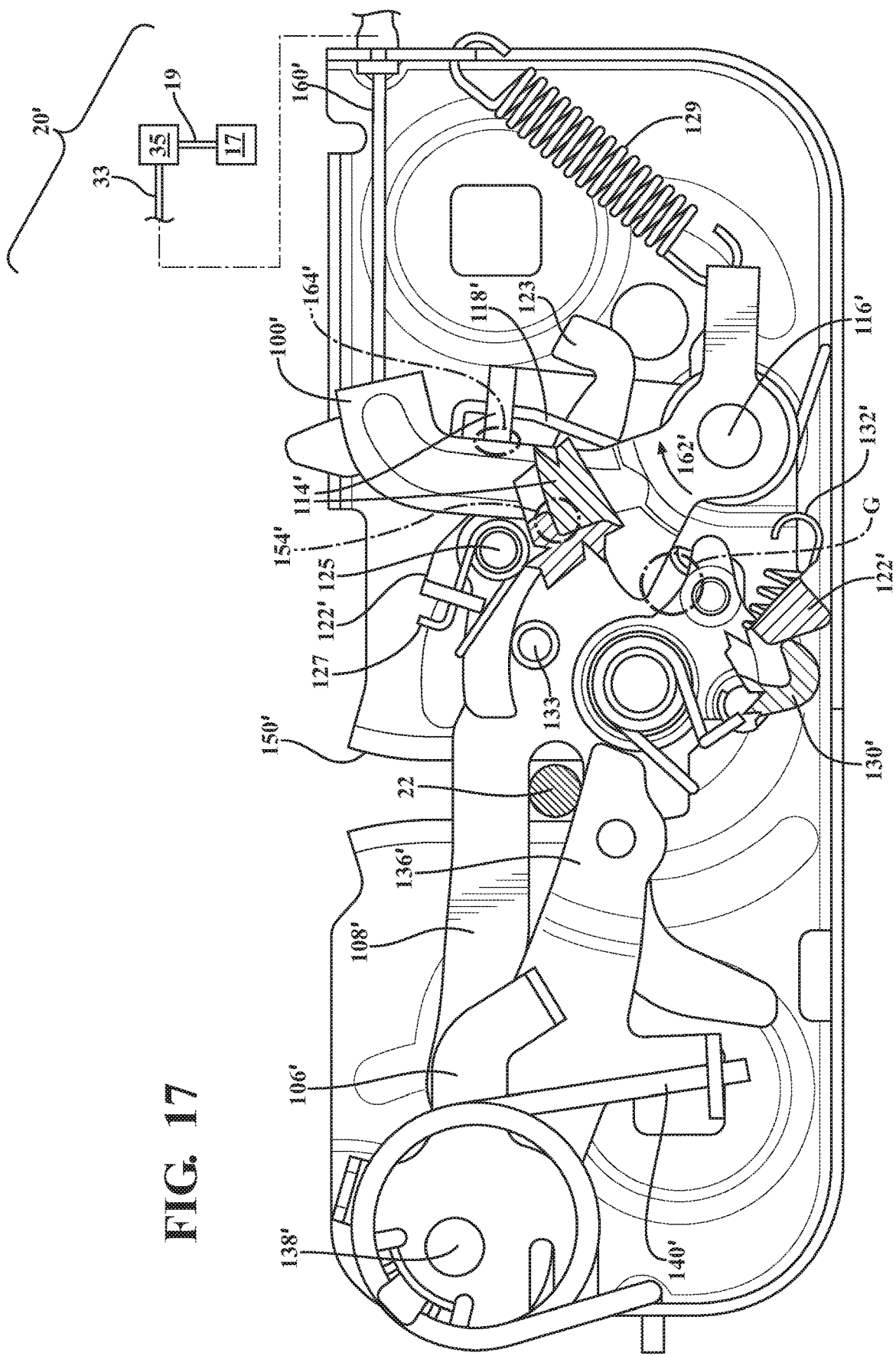
FIG. 17 is a view similar to FIG. 16, but showing portions removed for additional clarity with the latch assembly in the primary latched mode with the release lever shown in a "neutral" position.

FIG. 16 illustrates latch assembly 10' with striker 22 retained in a fishmouth 150' of housing 102' with ratchet 108' held in its primary striker capture position by primary pawl 114' (best shown in FIG. 17, circle 154' shows engagement of primary pawl 114' with a primary latch notch on ratchet 108'). The release lever 100' is biased in a counterclockwise direction via release lever spring 129, wherein circle 156' illustrates release lever 100' being biased into engagement with an upstanding pin on snow load lever 130'. This relationship results in snow load lever 130' being positioned against a hard stop 131 on housing 102'. FIG. 16 is reflective of the positioning of the latch components and particularly release lever 100' being in the home position when vehicle 11 is in motive operation, namely gearshift member 17 is shifted out of the parked state P into one of the non-parked states N, R, D.

FIG. 17 illustrates the components of latch assembly 10' when the gearshift member 17 is returned to its parked state P such that release lever 100' is automatically moved into its neutral position. Cable 160' is connected to release lever 100', such as with cable 160' being coupled for movement (directly or indirectly via communication link 33, actuation device 35, and electrical, mechanical or electromechanical connection 19, as discussed above for release lever 100) in response to selected movement of gearshift member 17. Release lever 100' is rotated, as indicated by arrow 162', by cable 160' which results in the contact between release lever 100' and primary pawl 114' (circle 164') and also causes release lever 100' to move out of contact with snow load lever 130' to create a gap G therebetween such that the snow load lever 130' and second pawl 122' are disengaged from one another. Circle 154' shows engagement of primary pawl 114' with a primary latch notch on ratchet 108'.

Figure 18:
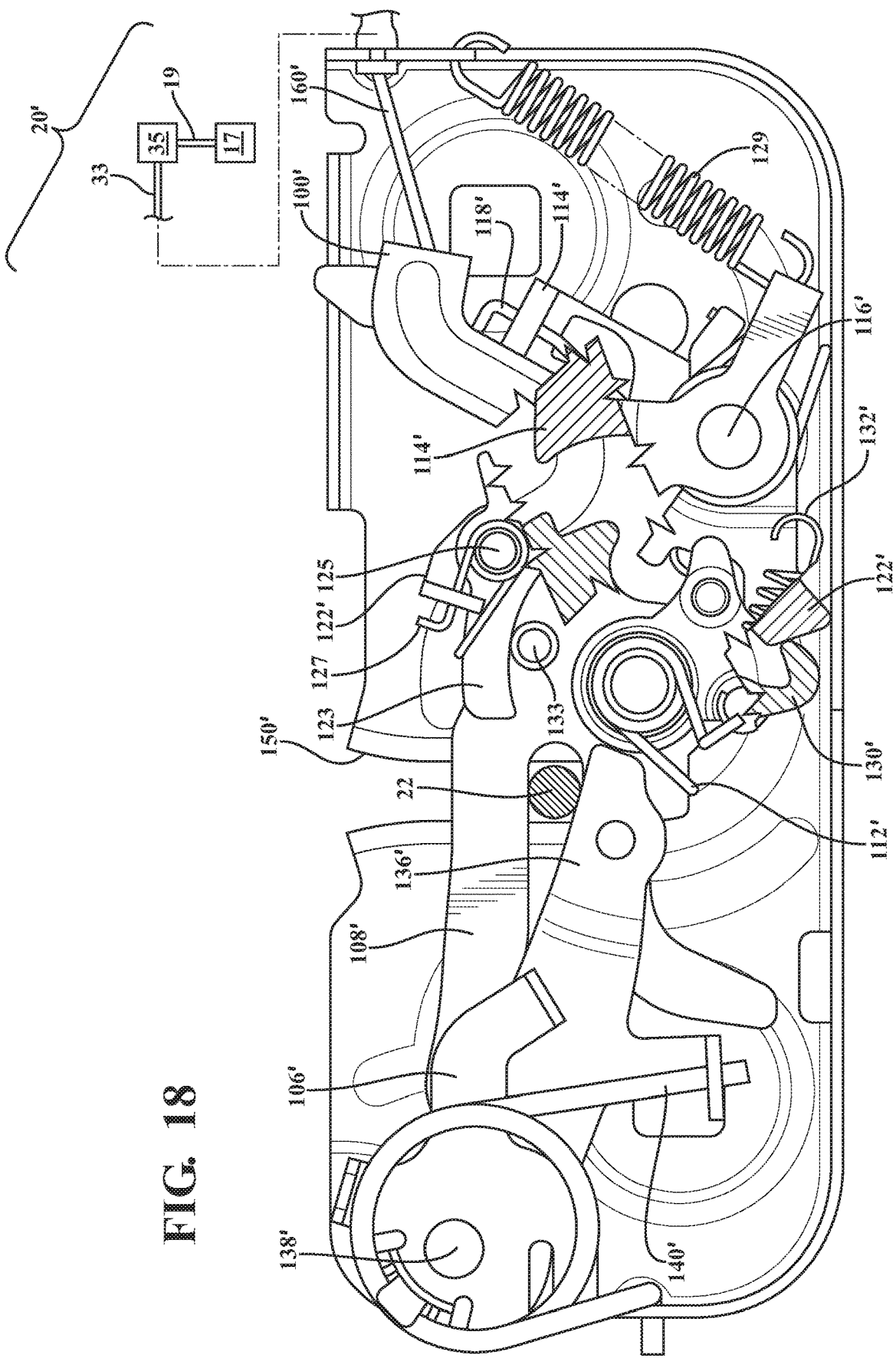
FIG. 18 is a plan view of the latch assembly of FIG. 15 with components moved following a first pull operation of a release device (mechanically coupled to the gearshift lever) with the release lever moved to an "actuated" position.
Figure 19:
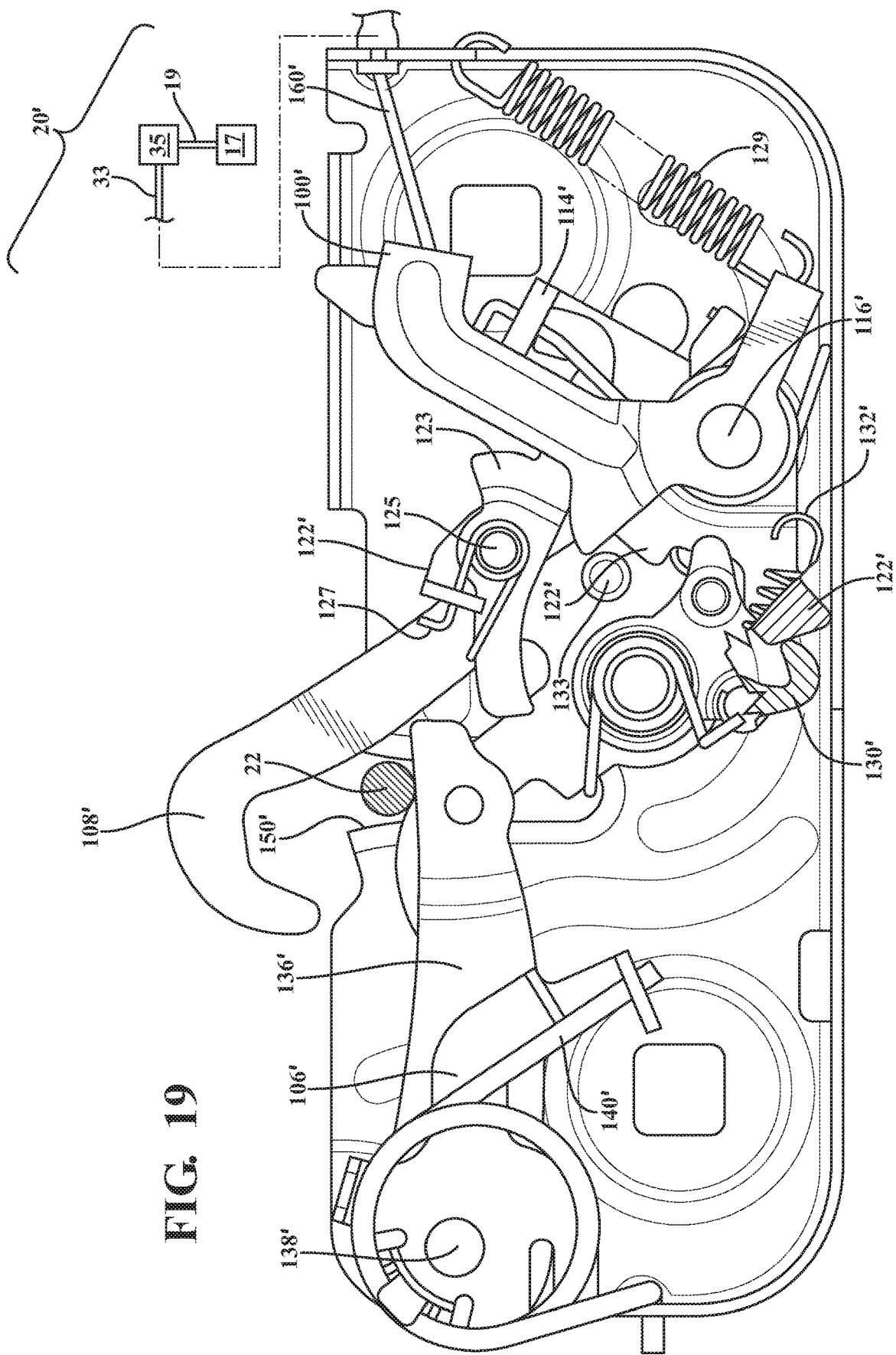
FIG. 19 is similar to FIG. 18 with a ratchet moved to an intermediate position awaiting return of the release lever to its neutral position.
Figure 20:
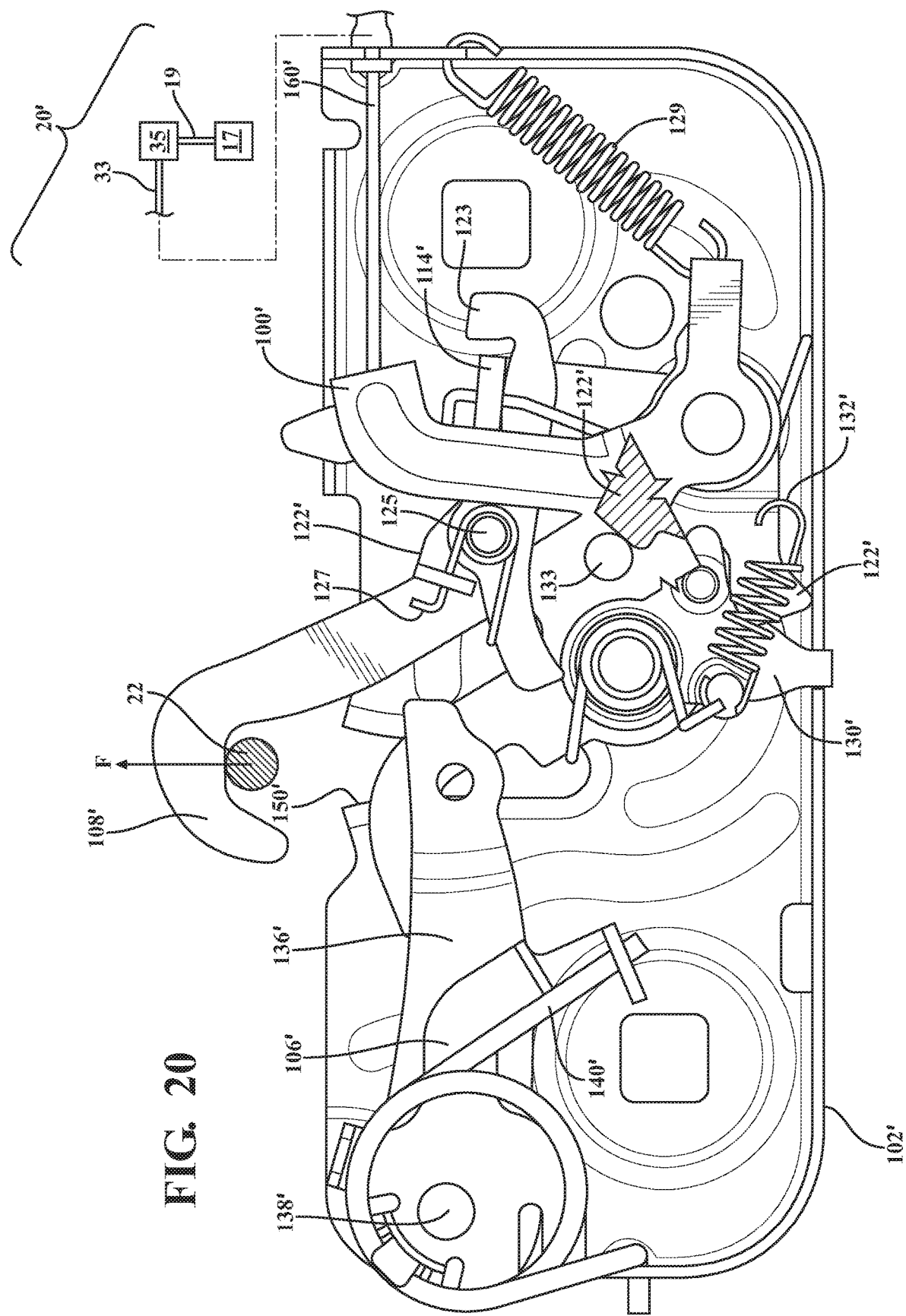
FIG. 20 is a plan view of the latch assembly of FIG. 15 upon release of the first pull such that the release lever is returned to its "neutral" position with the latch in a secondary latched mode.

FIGS. 18 and 19 illustrate the transverse movement of the gearshift member 17 along plane "B" to define a "first pull" on release lever 100', with both figures illustrating release lever 100' in the actuated position due to the first pull prior to release for subsequent return to the neutral position. Upon release lever 100' being released and returned to neutral position, lift lever 136' forcibly raises striker 22 a certain distance (e.g. 22 mm) from its primary striker capture position and the ratchet 108' is counterbalanced by the weight of the hood 13 and lift lever 136'. In the condition of FIG. 18, release lever 100' causes the primary pawl 114' to rotate clockwise such that the primary pawl 114' becomes disengaged from the ratchet 108' and an end region of the primary pawl 114' becomes aligned with an end region of the position lever 123. The position lever 123 is held by an abutting ratchet secondary pin 133. In FIG. 19, the ratchet 108' is shown rotated into its counterbalanced position and the end region of the position lever 123 rotates into contact with the end region of the primary pawl lever 114'. The secondary ratchet pin 133 is shown rotated clockwise toward the secondary pawl 122'. As shown in FIG. 20, with the release lever 100' shown returned to its neutral position, should a force F be applied upwardly on the ratchet 108', such as could occur if the hood were to raise upwardly, the secondary ratchet pin 133 engages a surface of the secondary pawl 122' to provide a secondary catch.

Figure 21:
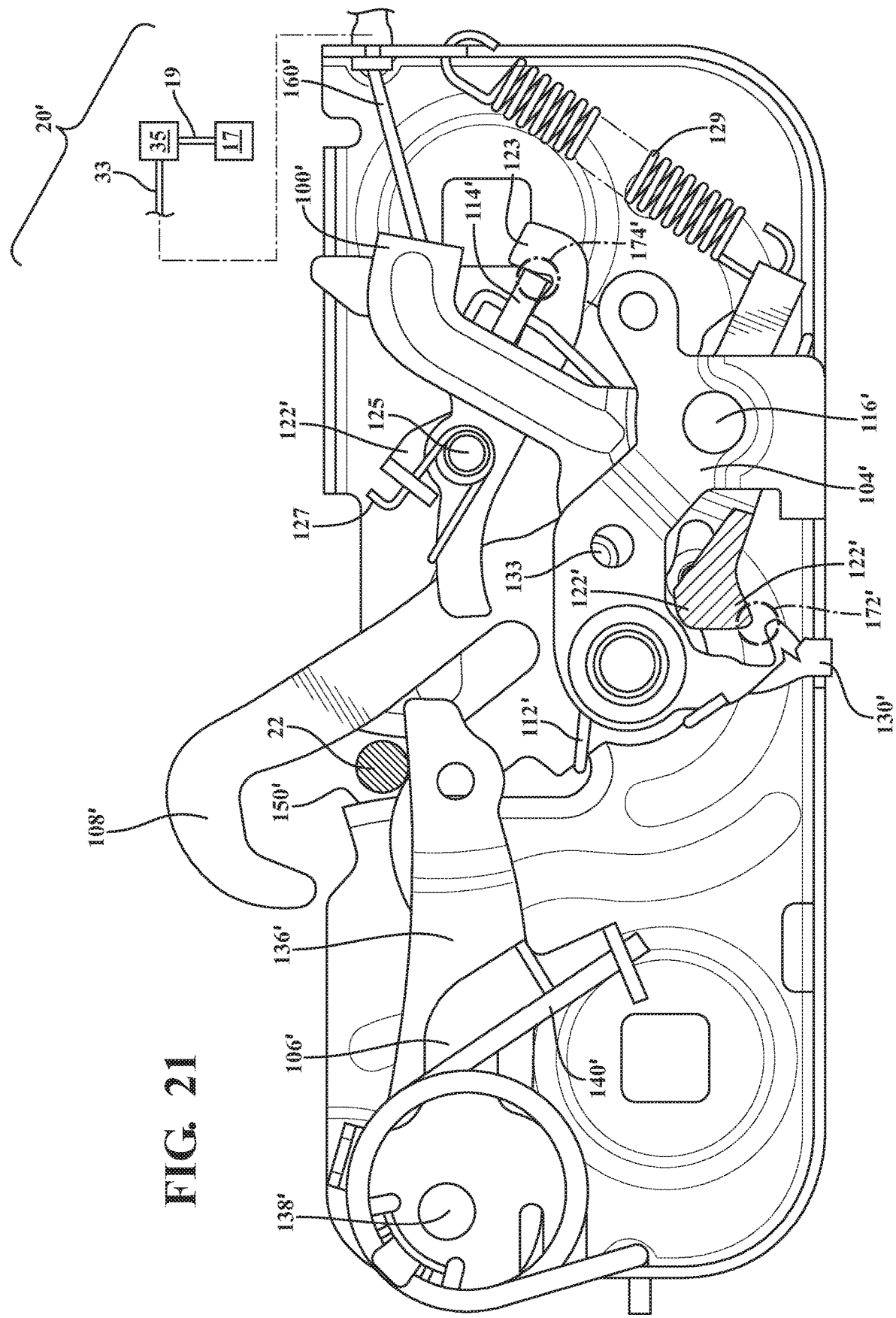
FIG. 21 is a plan view of the latch assembly of FIG. 15 with the components moved following a second pull operation on the release device.
Figure 22:
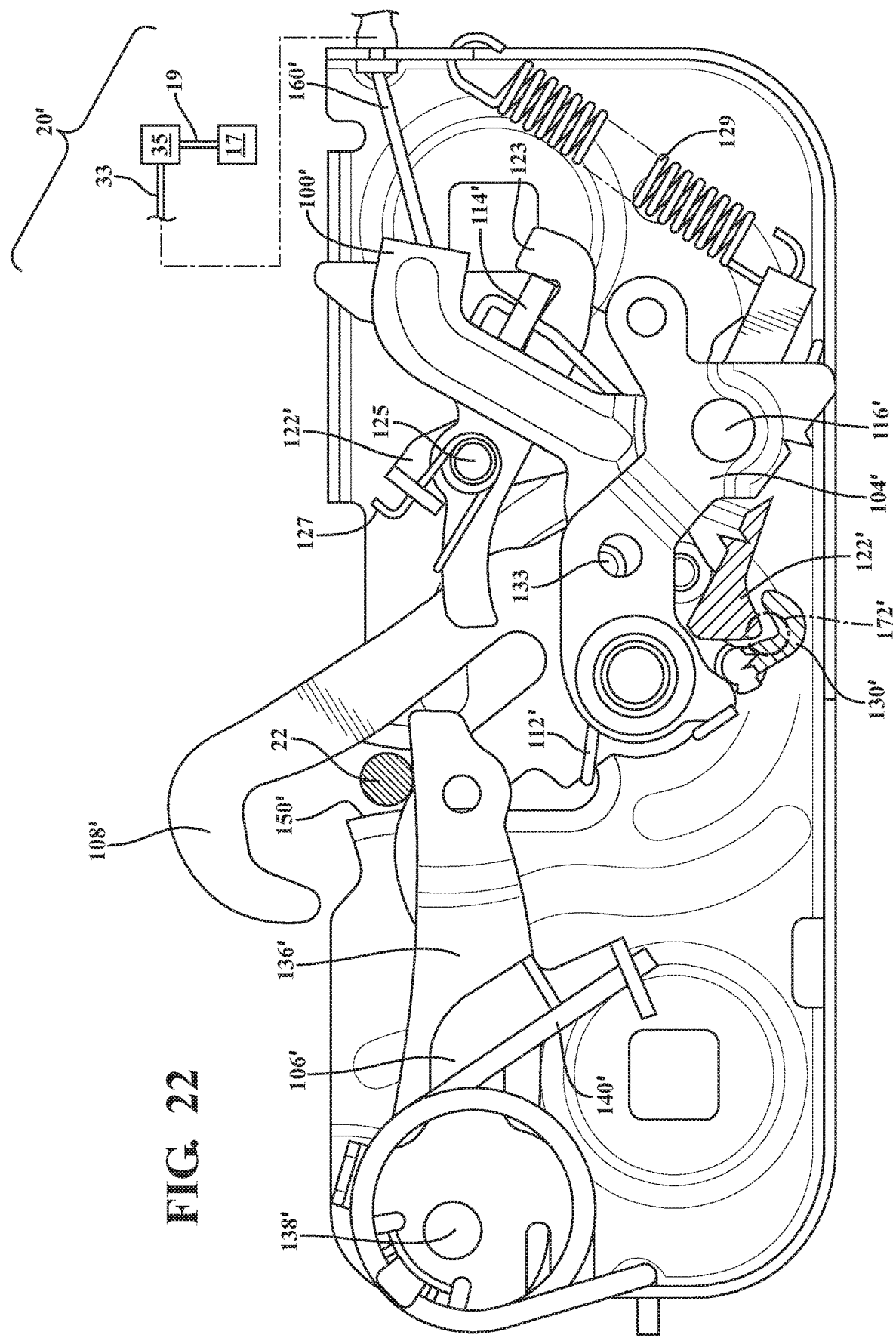
FIG. 22 is similar to FIG. 21 with some components broken away for clarity.
Figure 23:
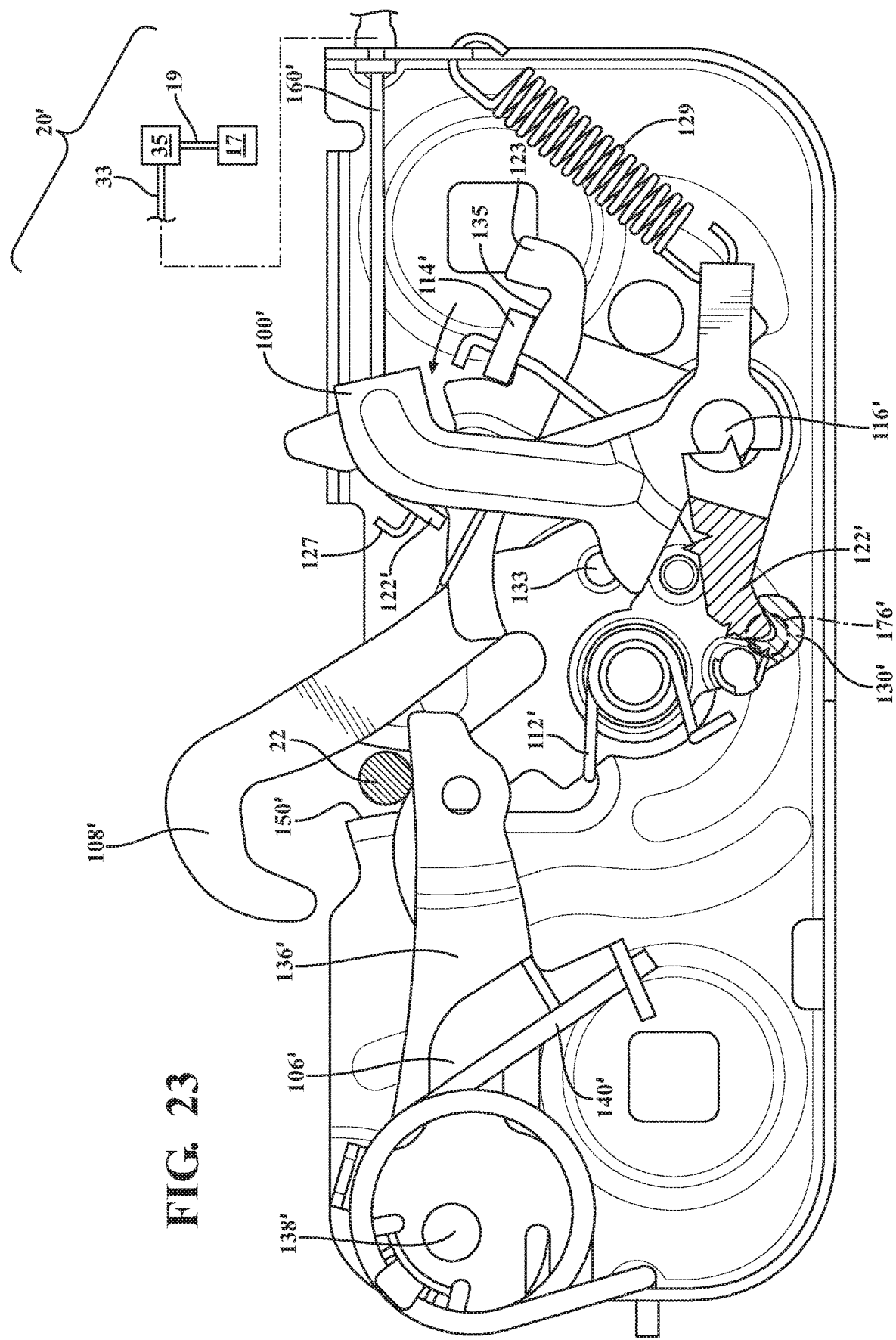
FIG. 23 is a plan view of the latch assembly in an opened mode following release of the release device following the second pull to allow opening of the hood.
Figure 24:
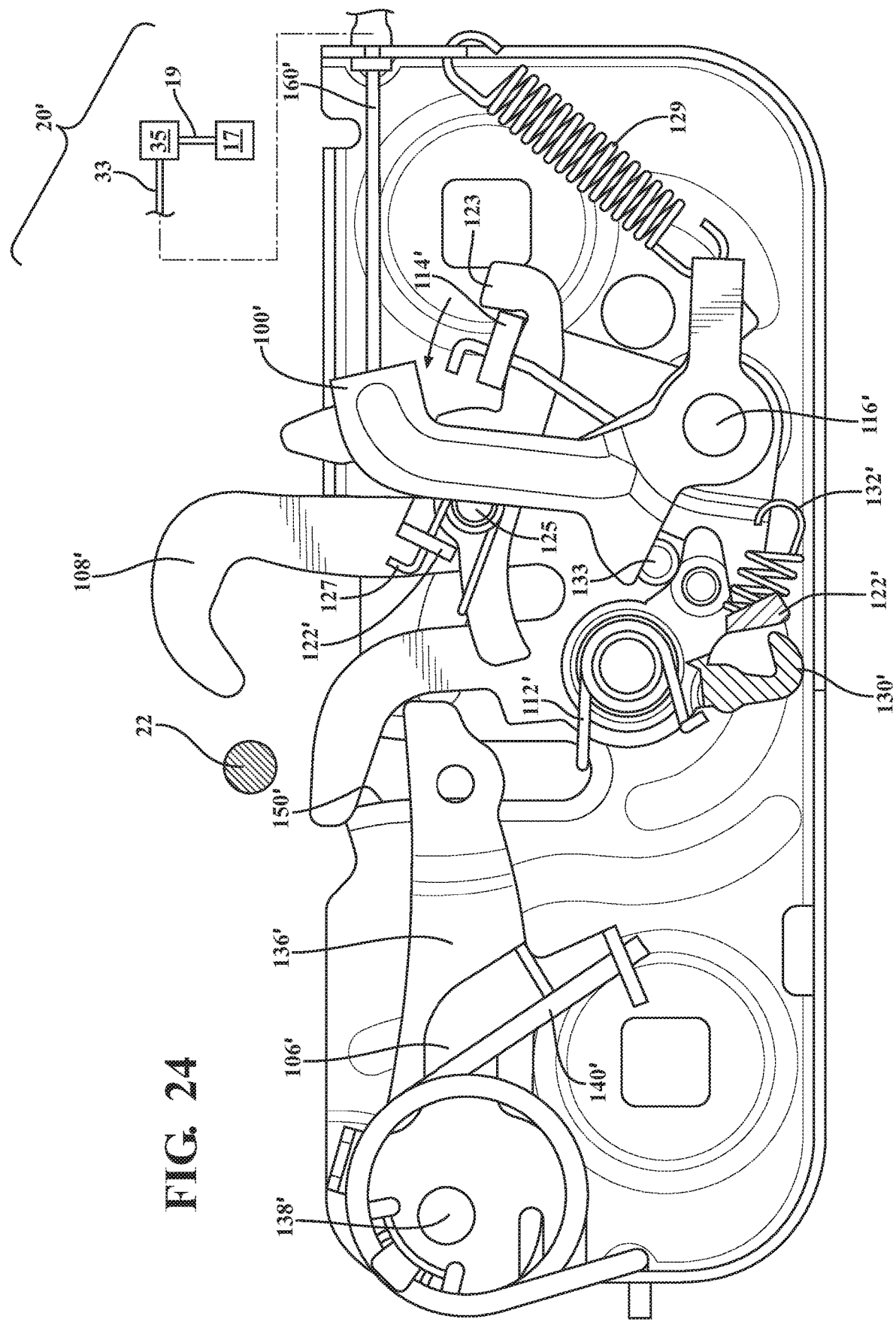
FIG. 24 shows a resetting of the latch upon movement of the ratchet to its fully open position.

FIGS. 21-22 illustrate the "second pull" associated with the second actuation of the gearshift member 17, such as along plane "B", so as to again move the release lever 100' from its neutral position to its actuated position. The travel of the release lever 100' due to the second pull, as discussed above for the release lever 100, is greater due to smaller radius on the ratchet profile, as discussed above for ratchet 108. Circle 172' (FIGS. 21, 22) shows snow load lever 130' engaging secondary pawl 122', while circle 174' (FIG. 21) shows clockwise rotation of the release lever 100' causes both the primary and secondary pawls 114', 122' to rotate clockwise, wherein the position lever 123, carried by the secondary pawl 122', rotates to a position of engagement with the primary pawl 114'. Upon release of release lever 100', as shown in FIG. 23, primary pawl 114' slides counterclockwise within a slot 135 of position lever 123 and is held by position lever 123. Circle 176' of FIG. 23 shows that snow load lever 130' supports the secondary pawl 122' in such a manner that ratchet 108' is no longer blocked from movement to a release position, and therefore, the hood 13 can be moved to opened position. When the hood 13 is physically moved (with ratchet 108' in its striker release position) to its fully open position, ratchet secondary pin 133 disengages snow load lever 130'. During opening, the snow load lever 130' is disengaged by ratchet 108' and is reset to its disengaged position, as shown in FIG. 24. This action resets the interlock arrangement, as discussed above, in anticipation of subsequent closure of the hood 13. Alternatively, as discussed above, but not mutually exclusive, the interlock arrangement, after the first pull but before the second pull, can be reset once the gearshift member 17 is again moved out of the parked P condition to a non-parked condition, as shown in FIG. 16 via release lever 100' contacting snow load lever 130'. As a result of the transition of gearshift member 17 from the parked state P into one of the non-parked states N, R, D, the snow load lever 130' is disengaged from ratchet 108' to allow the striker 22 to return to the secondary catch position with the ratchet 108'. This ensures that should a user intentionally, or unintentionally, cause the transverse movement of the gearshift member 17 along plane "B" to define a "first pull", and subsequently a "second pull" by way of example and without limitation, on release lever 100', yet does not exit the vehicle and return the hood 13 to a closed state (i.e. closing the hood to cause the ratchet 108' to move the snow load lever 130' into its disengaged position to allow the ratchet 108' to rotate to a primary or secondary striker capture positions), moving the gearshift member 17 out of the parked P condition causes the latch to reset, providing a secondary catch position (i.e. the ratchet 108' will be held in the secondary catch position). This occurs when the release lever 100' returns to the home position when the gearshift member 17 is moved out of the parked P condition and acts on the snow load lever 130' (seen at circle 156' of FIG. 16) to move the snow load lever 130' into its disengaged position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hood latch system for a motor vehicle, comprising:
    a latch assembly having a release lever, a pawl assembly, and a ratchet, the release lever being pivotable from a home position, wherein the pawl assembly is maintained in locked engagement with the ratchet to maintain a striker fixed to a hood of the motor vehicle in a fully latched state in the ratchet, to a neutral position wherein the pawl assembly is selectively movable to a release position out of locked engagement with the ratchet, whereupon the ratchet, while released from locked engagement from the pawl assembly, releases the striker from the ratchet; and
    an interlock device configured in operable communication with the release lever, the interlock device capable of recognizing a parked state and a non-parked state of the motor vehicle, the interlock device capable of maintaining the release lever in the home position to prevent unintended release of the striker from the ratchet when the interlock device recognizes the non-parked state of the motor vehicle, and automatically moving the release lever to the neutral position when the interlock device recognizes the parked state of the motor vehicle.

2. The hood latch system of claim 1, wherein the interlock device comprises a gearshift member having a parked position and a plurality of non-parked positions, the gearshift member configured to shift the motor vehicle between the parked state and the non-parked state.

3. The hood latch system of claim 2, further including an actuation device arranged in operable communication with the gearshift member and the release lever, the actuation device causing the release lever to move in response to actuation of the gearshift member.

4. The hood latch system of claim 3, further including a cable connecting the actuation device to the release lever.

5. The hood latch system of claim 3, wherein the gearshift member is in electrical communication with the actuation device.

6. The hood latch system of claim 2, wherein the release lever is configured for a double pull actuation via selective dual actuation of the gearshift member while in the parked position, wherein upon a first actuation of the gearshift member, while in the parked position, the pawl assembly maintains the ratchet in a partially released position to prevent complete release of the striker from the ratchet, and wherein upon a second actuation of the gearshift member, while in the parked position, the pawl assembly releases the ratchet from the striker.

7. The hood latch system of claim 6, wherein the pawl assembly comprises a primary pawl configured to engage the ratchet in a primary ratchet capture position, and a secondary pawl configured to engage the ratchet in a secondary ratchet capture position, wherein upon the first actuation of the gearshift member, while in the parked position, the primary pawl is disengaged from the ratchet to allow the ratchet to rotate to the secondary ratchet capture position whereat the secondary pawl engages the ratchet in the secondary ratchet capture position to prevent release of the striker from the ratchet, and wherein upon the second actuation of the gearshift member, while in the parked position, the secondary pawl releases the ratchet from the secondary capturing position to release the striker from the ratchet.

8. The hood latch system of claim 7, further comprising:
    a snow load lever moveable between an engaged position and a disengaged position, wherein when in the engaged position the snow load lever maintains the secondary pawl disengaged from the ratchet;
    wherein when the release lever moves to the home position upon the interlock device recognizing the gearshift member shifting from the parked state to the non-parked state, the release lever engages the snow load lever to move the snow load lever from the engaged position to the disengaged position to allow the secondary pawl to engage the ratchet in the secondary ratchet capture position.

9. The hood latch system of claim 2, wherein the gearshift member is movable along a first plane between the parked position and the plurality of non-parked positions wherein the release lever remains in the home position, and is movable along a second plane, transverse to the first plane, wherein the release lever moves to the neutral position.

10. The hood latch system of claim 9, wherein the gearshift member is configured for dual actuation along the second plane from the parked position to an actuated position and back to the parked position, wherein during a first actuation the pawl assembly maintains the ratchet in a first release position to partially release the striker from the ratchet but prevent complete release of the striker from the ratchet, and wherein upon a second actuation of the gearshift member from the parked position to the actuated position and back to the parked position, the pawl assembly allows the ratchet to completely release the striker from the ratchet.

11. A method of preventing an inadvertent unlatching of a latch assembly for a motor vehicle, comprising:
operably communicating a gearshift member with a release lever of the vehicle latch assembly having a pawl and a ratchet, and configuring the gearshift member to maintain the release lever in a locked, home position to maintain the pawl in locked abutment with the ratchet, wherein a striker fixed to a hood of the motor vehicle is maintained within a fishmouth of the vehicle latch assembly, when the gearshift member is in a non-parked position; and
configuring the communicating between the gearshift member and the release lever to cause the release lever to move to an active position to move the pawl out of locked abutment with the ratchet upon selective actuation of the gearshift member while in a parked position.

12. A method of preventing an inadvertent unlatching of a latch assembly for a motor vehicle, comprising:
operably communicating a gearshift member with a release lever of the vehicle latch assembly having a pawl and a ratchet, and configuring the gearshift member to maintain the release lever in a locked, home position to maintain the pawl in locked abutment with the ratchet, wherein a striker fixed to a hood of the motor vehicle is maintained within a fishmouth of the vehicle latch assembly, when the gearshift member is in a non-parked position; and
configuring the release lever for a double pull actuation via selective dual actuation of the gearshift member while in the parked position, wherein upon a first actuation of the gearshift member, while in a parked position, the pawl maintains the ratchet in position to prevent release of the striker from the ratchet, and wherein upon a second actuation of the gearshift member, while in the parked position, the pawl releases the ratchet from capturing engagement with the striker.

13. The method of claim 12, further comprising configuring the gearshift member to cause the release lever to return the ratchet into a partially locked engagement with the pawl after the second actuation upon moving the gearshift member from the parked position to the non-parked position, thereby returning the striker to at least a partially captured state with the ratchet.

14. A method of preventing an inadvertent unlatching of a latch assembly for a motor vehicle, comprising:
operably communicating a gearshift member with a release lever of the vehicle latch assembly having a pawl and a ratchet, and configuring the gearshift member to maintain the release lever in a locked, home position to maintain the pawl in locked abutment with the ratchet, wherein a striker fixed to a hood of the motor vehicle is maintained within a fishmouth of the vehicle latch assembly, when the gearshift member is in a non-parked position; and
configuring the gearshift member for movement along a first plane between a parked position and the non-parked positions whereupon the pawl remains in the locked, home position, and for movement along a second plane, transverse to the first plane, whereupon the pawl releases the ratchet for movement to a release position, thereby allowing the striker to be released from the fishmouth of the vehicle latch assembly.

15. A method of preventing an inadvertent unlatching of a latch assembly for a motor vehicle, comprising:
operably communicating a gearshift member with a release lever of the vehicle latch assembly having a pawl and a ratchet, and configuring the gearshift member to maintain the release lever in a locked, home position to maintain the pawl in locked abutment with the ratchet, wherein a striker fixed to a hood of the motor vehicle is maintained within a fishmouth of the vehicle latch assembly, when the gearshift member is in a non-parked position; and
arranging an actuation device in operable communication with the gearshift member and the release lever and configuring the actuation device to cause the release lever to move in response to actuation of the gearshift member.

16. The method of claim 15, further comprising configuring the gearshift member in electrical communication with the actuation device.

17. The method of claim 15, further comprising connecting the actuation device to the release lever with a cable.

18. A method of preventing an inadvertent unlatching of a latch assembly for a motor vehicle, comprising:
operably communicating a gearshift member with a release lever of the vehicle latch assembly having a pawl and a ratchet, and configuring the gearshift member to maintain the release lever in a locked, home position to maintain the pawl in locked abutment with the ratchet, wherein a striker fixed to a hood of the motor vehicle is maintained within a fishmouth of the vehicle latch assembly, when the gearshift member is in a non-parked position; and
configuring the release lever to move a snow load lever from an engaged position wherein the snow load lever maintains the pawl disengaged from the ratchet, to a disengaged position wherein the pawl is allowed to engage the ratchet at a partially released position to prevent complete release of the striker from the ratchet, when the release lever moves to the home position upon the gearshift member shifting from a parked position to the non-parked position.

19. A hood latch system for a motor vehicle, comprising:
a latch assembly having a release lever, a ratchet, a pawl assembly comprising a primary pawl configured to engage the ratchet in a primary ratchet capture position and a secondary pawl configured to engage the ratchet in a secondary ratchet capture position, and a snow load lever moveable between an engaged position and a disengaged position wherein when in the engaged position the snow load lever maintains the secondary pawl disengaged from the ratchet; the release lever being pivotable between a home position wherein the pawl assembly is maintained in locked engagement with the ratchet to maintain a striker fixed to a hood of the motor vehicle in a latched state in the ratchet, and a neutral position wherein the pawl assembly is selectively movable to the secondary ratchet capture position, whereupon the ratchet, while in the secondary ratchet position, maintains the striker in a partially latched state in the ratchet; and an interlock device configured in operable communication with the release lever, the interlock device capable of recognizing a parked state and a non-parked state of the motor vehicle and moving the release lever to the home position upon the interlock device recognizing the motor vehicle shifting from the parked state to the non-parked state;

wherein when the release lever is moved to the home position the release lever engages the snow load lever to move the snow load lever from the engaged position to the disengaged position to allow the secondary pawl to engage the ratchet into the secondary ratchet capture position.

* * * * *